United States Patent
Ohsuga et al.

(10) Patent No.: US 6,828,156 B2
(45) Date of Patent: Dec. 7, 2004

(54) EVALUATING METHOD FOR $NO_x$ ELIMINATING CATALYST, AN EVALUATING APPARATUS THEREFOR, AND AN EFFICIENCY CONTROLLING METHOD THEREFOR

(75) Inventors: Minoru Ohsuga, Katsuta (JP); Mamoru Fujieda, Tomobe-machi (JP); Nobuo Kurihara, Hitachioota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/152,795

(22) Filed: May 23, 2002

(65) Prior Publication Data

US 2002/0132352 A1 Sep. 19, 2002

Related U.S. Application Data

(60) Continuation of application No. 09/814,792, filed on Mar. 23, 2001, which is a continuation of application No. 08/917,819, filed on Aug. 27, 1997, now abandoned, which is a division of application No. 08/264,068, filed on Jun. 22, 1994, now Pat. No. 5,693,877.

(30) Foreign Application Priority Data

Jun. 22, 1993 (JP) ............................................. 5-150101

(51) Int. Cl.[7] .............................................. G01M 19/00
(52) U.S. Cl. ........................... 436/135; 60/276; 60/277; 60/285; 123/703
(58) Field of Search .......................... 60/276, 277, 285; 123/703; 436/135

(56) References Cited

U.S. PATENT DOCUMENTS

| | | | | |
|---|---|---|---|---|
| 4,251,989 A | * | 2/1981 | Norimatsu et al. ........... | 60/276 |
| 4,445,483 A | * | 5/1984 | Hasegawa .................... | 123/492 |
| 4,729,219 A | * | 3/1988 | Kayanuma et al. ........... | 60/274 |
| 4,739,614 A | * | 4/1988 | Katsuno et al. .............. | 60/274 |
| 5,097,700 A | * | 3/1992 | Nakane ..................... | 73/118.1 |
| 5,168,701 A | * | 12/1992 | Yamamoto et al. ........... | 60/274 |
| 5,177,464 A | * | 1/1993 | Hamburg ..................... | 340/439 |
| 5,191,762 A | * | 3/1993 | Kuroda et al. ............... | 60/276 |
| 5,228,286 A | * | 7/1993 | Demura ....................... | 60/276 |
| 5,386,695 A | * | 2/1995 | Iwata et al. .................. | 60/276 |

FOREIGN PATENT DOCUMENTS

| | | |
|---|---|---|
| JP | 05-248228 | 9/1993 |
| JP | 05-312025 | 11/1993 |
| JP | 06-265498 | 9/1994 |

* cited by examiner

*Primary Examiner*—Jill Warden
*Assistant Examiner*—Monique T. Cole
(74) *Attorney, Agent, or Firm*—Crowell & Moring LLP

(57) ABSTRACT

In order to prevent a catalyst for an internal combustion engine from decreasing efficiency by deterioration after long time use of the catalyst, the decreased efficiency of the catalyst is determined, and the internal engine is controlled based on results of the determination so as to maintain high efficiency of the catalyst. The catalyst is installed in an exhaust pipe of the engine. Sensors for detecting conditions of exhaust gas both at upstream side and downstream side of the catalyst are provided, respectively. As for the sensor, for example, an oxygen sensor of which output varies stepwise at $\lambda=1$, or a sensor of which output varies in proportion to air-fuel ratio can be used. Detected values of the sensors are taken into a control unit, eliminating efficiency and deteriorating degree of the catalyst are estimated by comparison of the detected values, and the engine is controlled so that the eliminating efficiency becomes maximum. In accordance with the present invention, a preferable exhaust gas cleaning characteristics of the catalyst can be maintained because the decreased efficiency of the catalyst is determined exactly and the engine is controlled so as to prevent the catalyst from decreasing efficiency.

8 Claims, 23 Drawing Sheets

NOx, HC, O2          N2, H2O, CO2

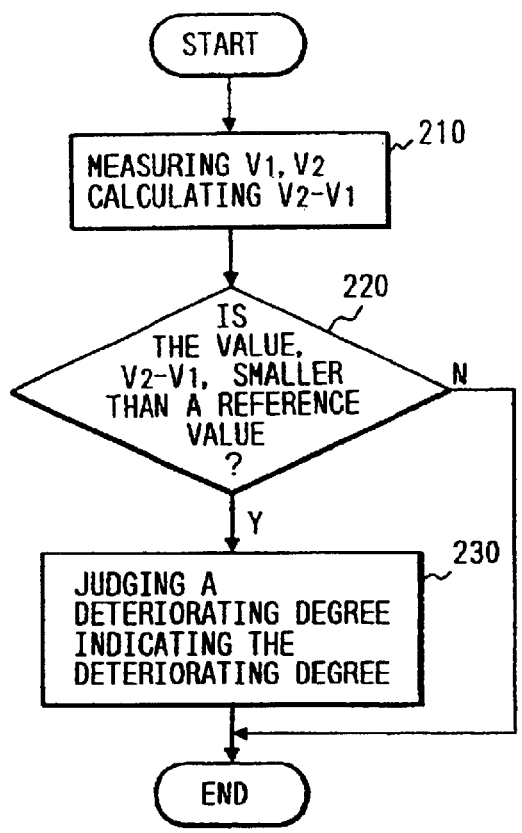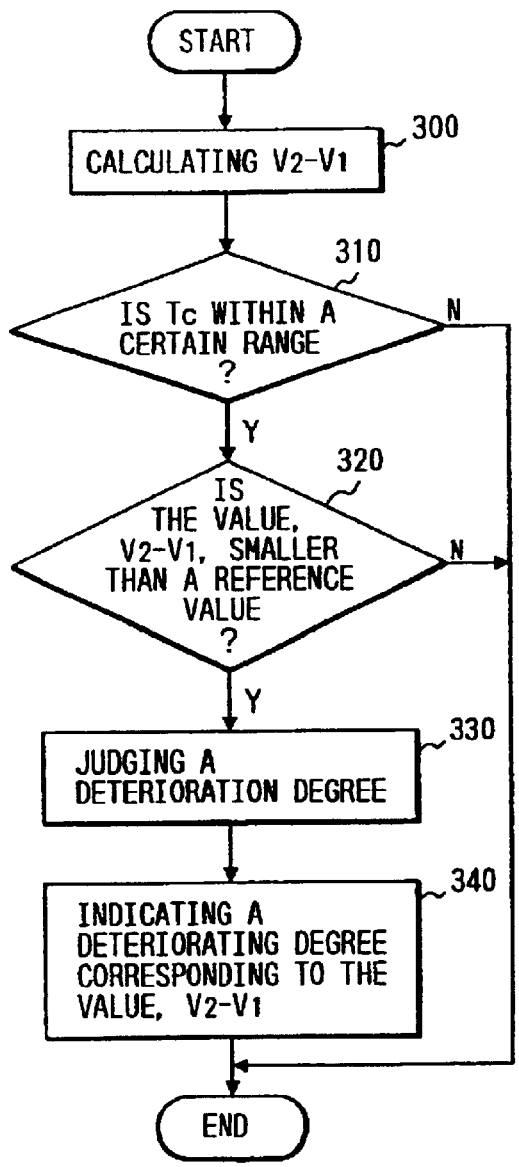

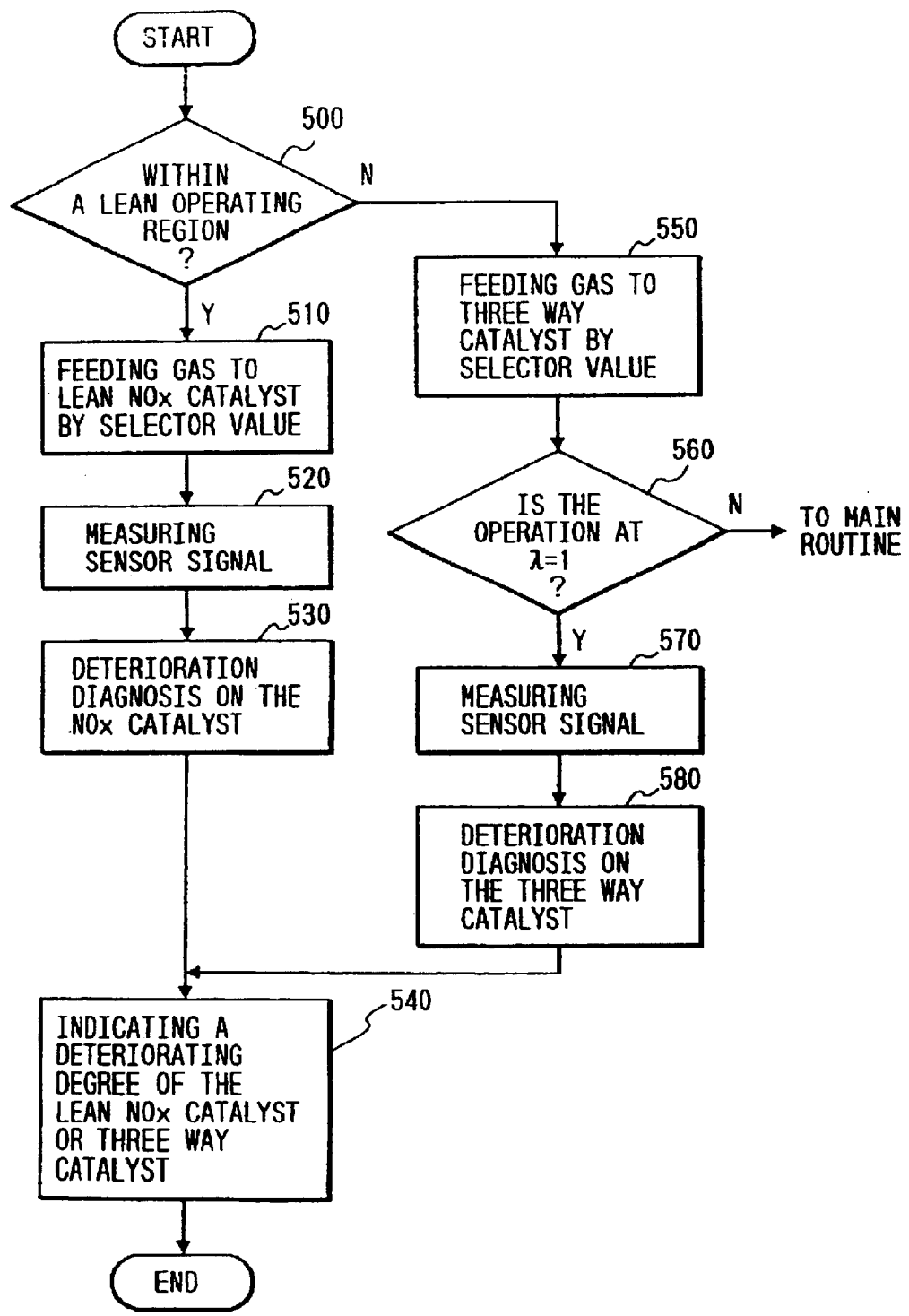

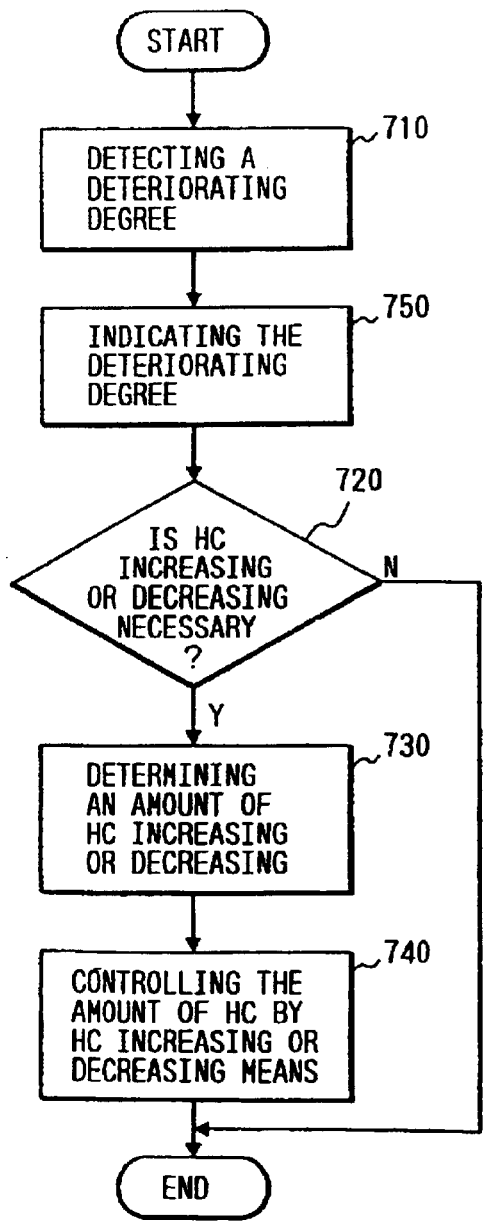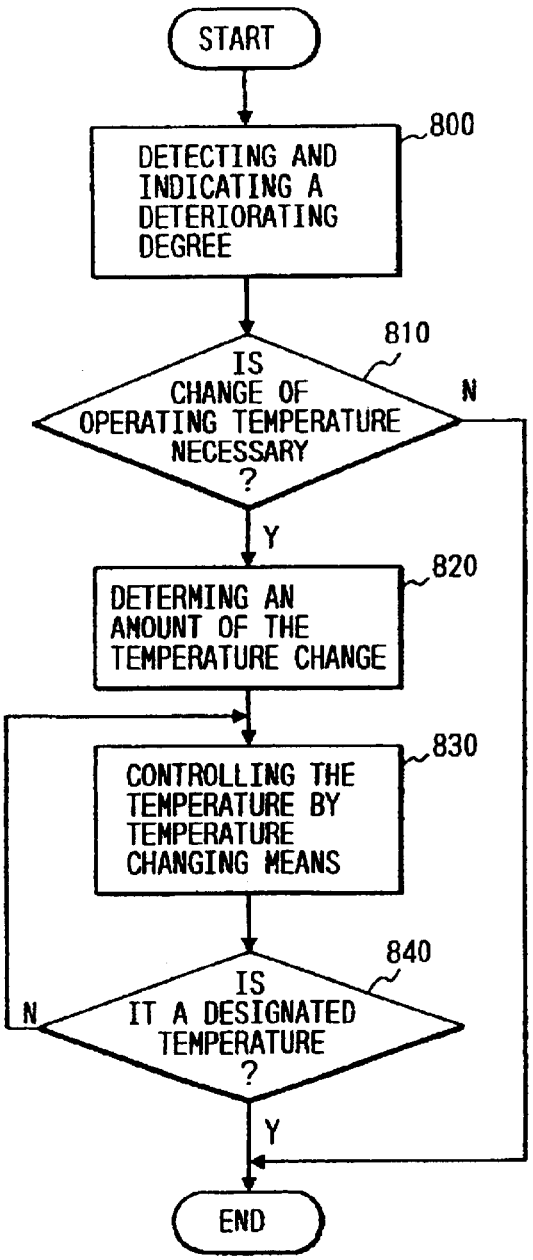

EVALUATING METHOD FOR $NO_x$ ELIMINATING CATALYST, AN EVALUATING APPARATUS THEREFOR, AND AN EFFICIENCY CONTROLLING METHOD THEREFOR

This application is a continuation of application Ser. No. 09/814,792, filed Mar. 23, 2001, which is a continuation application Ser. No. 08/917,819, filed Aug. 27, 1997, which is a divisional application Ser. No. 08/264,068, filed Jun. 22, 1994 now U.S. Pat. No. 5,693,877.

BACKGROUND OF THE INVENTION (1) Field of the Invention

The present invention relates to an evaluating method for $NO_x$ eliminating catalyst provided in an exhaust gas system of internal combustion engines, an evaluating apparatus therefor, and an efficiency controlling method therefor. The above described $NO_x$ eliminating catalyst means essentially a catalyst for eliminating $NO_x$ components in exhaust gas for cleaning the exhaust gas in the exhaust gas system of the internal combustion engine.

(2) Description of the Prior Art

As for a method for estimating efficiency decrease and deterioration of $NO_x$ eliminating catalyst, a method has been proposed in JP-A-4-265414 (1992), for example, wherein, taking a travelling distance of an automobile as a parameter, efficiency of $NO_x$ eliminating catalyst in the automobile is deemed to be sufficiently deteriorated when the travelling distance exceeds a designated value.

Further, a method for increasing an amount of hydrocarbon (called as HC hereinafter) when the HC used for $NO_x$ eliminating catalyst is deemed to be insufficient has been proposed in JP-A-3-229914 (1991).

However, there has been a problem that the prior art described above are unable to evaluate the catalyst correctly because they use a travelling distance as a parameter for evaluating the catalyst indirectly.

Furthermore, regarding to the prior art controlling the amount of HC, there has been a problem that the prior art can not control the amount of HC correctly because it controls the amount of HC irrelevant to the evaluating result of the catalyst deterioration.

SUMMARY OF THE INVENTION (1) Objects of the Invention

In order to solve the above described problems, the object of the present invention is to provide a preferable evaluating method for $NO_x$ eliminating catalyst, a preferable evaluating apparatus for $NO_x$ eliminating catalyst, and a preferable efficiency evaluating method for $NO_x$ eliminating catalyst.

(2) Methods for solving the Problems

One of features of the present invention is essentially in an evaluating method of $NO_x$ eliminating catalyst for eliminating $NO_x$ components in exhaust gas, which is characterized in evaluating the $NO_x$ eliminating catalyst by comparing physical parameters of specified exhaust gas components both at an upstream side and a downstream side of the $NO_x$ eliminating catalyst.

Other one of the features of the present invention is essentially in an evaluating apparatus for $NO_x$ eliminating catalyst comprising;

(a) a base body composed of ion conductive solid electrolyte, (b) platinum electrodes provided at both sides of the base body putting the base body between, (c) diffused resistors covering the both electrodes respectively, (d) exhaust gas inlet paths for flowing exhaust gas at upstream side of the $NO_x$ eliminating catalyst to one of the diffused resistors and flowing exhaust gas at downstream side of the $NO_x$ eliminating catalyst to the another of the diffused resistors respectively, (e) an output portion which supplies an electrical signals output generated between the both platinum electrodes to a postfixed evaluating means.

Furthermore, other one of the features of the present invention is essentially in an efficiency controlling method for $NO_x$ eliminating catalyst for eliminating $NO_x$ components in exhaust gas, which is characterized in including the steps of evaluating the $NO_x$ eliminating catalyst first and subsequently elevating a temperature of the $NO_x$ eliminating catalyst or increasing an amount of HC.

In the above evaluating apparatus, oxygen concentration in exhaust gas at downstream of the $NO_x$ eliminating catalyst increases by reducing effect of the $NO_x$ eliminating catalyst. Therefore, efficiency and a deterioration degree of the $NO_x$ eliminating catalyst can be estimated by comparing physical parameters of specified gas components at upstream side and that at downstream side of the $NO_x$ eliminating catalyst.

BRIEF DESCRIPTION OF THE DRAWINGS

FIG. 8 is a flow diagram relating to the present invention, FIG. 9 is a flow diagram relating to the present invention, FIG. 14 is a flow diagram for controlling the detecting apparatus shown in FIG. 13, FIG. 15(A) and FIG. 15(B) are schematic illustrations for explaining another detecting method relating to the present invention, FIG. 23 is a flow diagram for control in the detecting methods shown in FIG. 21 and FIG. 22, FIG. 24 is a flow diagram for control in the detecting methods shown in FIG. 21 and FIG. 22.

DETAILED DESCRIPTION OF THE EMBODIMENTS

Embodiment 1

Figure 1:
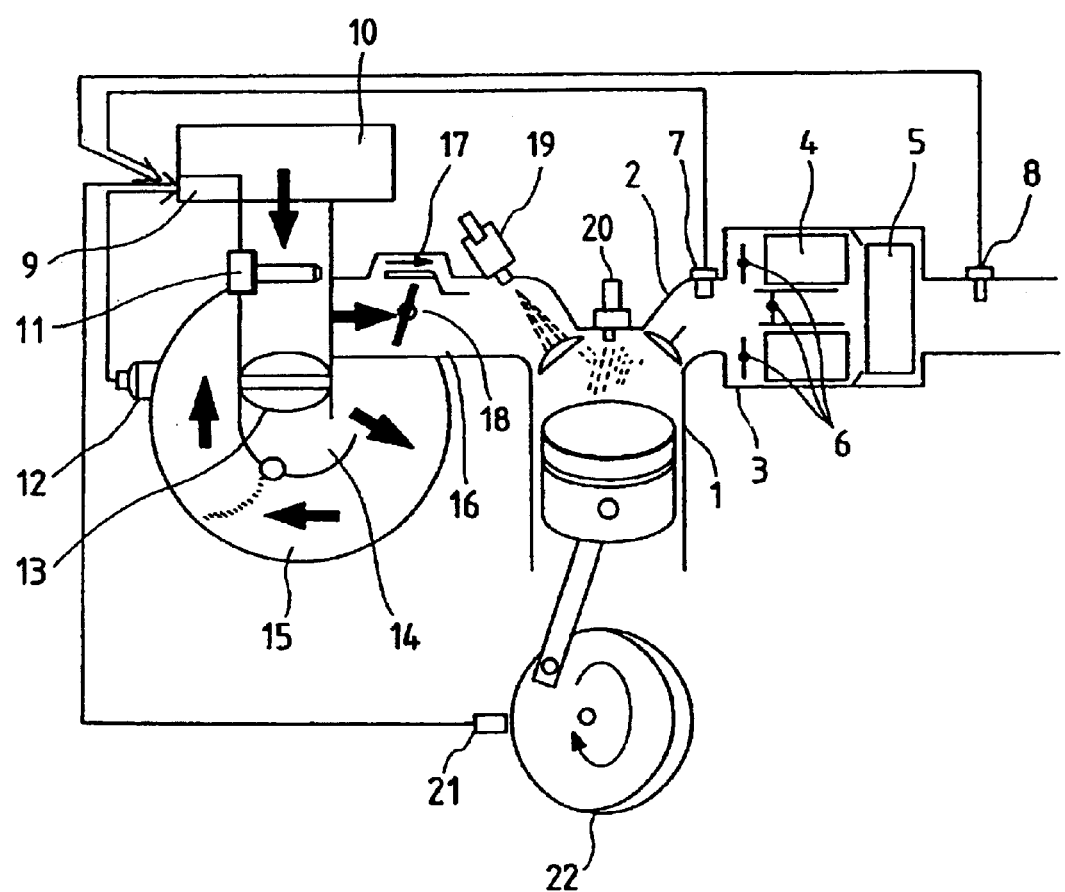
FIG. 1 is a simplified diagrammatic view showing a total system of the present invention.

A simplified diagrammatic view showing a total system of an embodiment of the present invention is illustrated in FIG. 1.

A catalyst 3 is connected to an exhaust gas pipe 2 of an engine 1. In the catalyst 3, lean $NO_x$ catalysts 4 for eliminating $NO_x$ under a lean air-fuel ratio condition, and a three way catalyst or an oxide catalyst 5 for eliminating $NO_x$, CO, and HC under a theoretical air-fuel ratio condition. The catalyst 3 is composed in a manner so as to switch the above two kinds of catalysts by switching valves 6 depending on an operating condition of the engine. As for the lean $NO_x$ catalyst, a copper-zeolite catalyst containing metals, for example, can be used. However, the above exemplified catalyst generally has such a characteristics that the catalyst deteriorates itself under a high temperature or a rich air-fuel ratio condition. Therefore, bypassing the lean $NO_x$ catalyst are preferable in some cases, for example, when in a power driving condition, in a warming up condition at starting, and so on. Accordingly, the switching valves 6 are provided. Under a lean operation condition, the switching valves 6 are closed so as to supply exhaust gas to the lean $NO_x$ catalyst. On the other hand, under a rich air-fuel mixture condition such as a power driving condition and a warming up condition at starting, the switching valves 6 are opened so as to supply the exhaust gas to the three way catalyst or the oxide catalyst provided at downstream side. In order to determine $NO_x$ conversion efficiency of the lean $NO_x$ catalyst, sensors 7, 8, for detecting the exhaust gas conditions are provided at, for instance, before and after the catalyst 3. As for the sensors 7, 8, for example, an oxygen sensor of which output changes stepwise by an excess air factor $\lambda=1$, and an air-fuel ratio sensor of which output changes proportionally to the excess air factor can be usable. Detected values at the above two sensors are taken into a control unit 9, and the conversion efficiency or a deteriorating degree of the catalyst is determined by comparing the values. Air taken through an air cleaner 10 is flowed into a collector 14, after being measured its amount by an air sensor 11, via a throttle 13 which is driven by an electric motor 12. Subsequently, the air passes through an independent intake pipe 15 and is taken into the engine 1. At an intake port portion 16, a bypassing path 17 and a dividing valve 18 for generating swirls are provided. In a lean operating region, it is necessary to form swirls in a combustion chamber for improving combustion. Accordingly, in the above case, the dividing valve 18 is closed so that the air flows through the bypassing path 17. Drift is caused in the air, and consequently, swirls are generated in the combustion chamber. Fuel is supplied through a fuel injector 19. The air-fuel mixed gas is ignited by an ignition plug 20. A crank angle detector 21 for determining rotation of the engine shaft per an unit time is provided at a crank shaft 22.

Figure 2A:
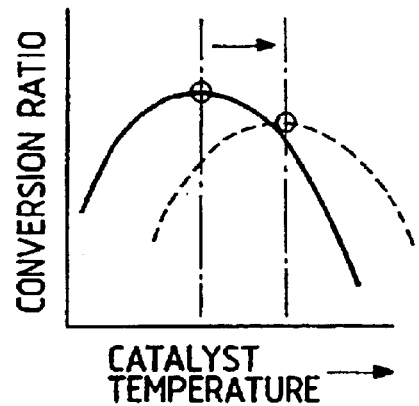
FIG. 2(A) and FIG. 2(B) are graphs showing characteristic of catalyst conversion efficiency.
Figure 2B:
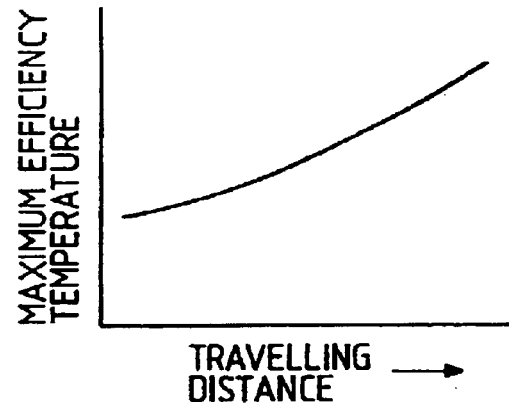
Figure 3A:
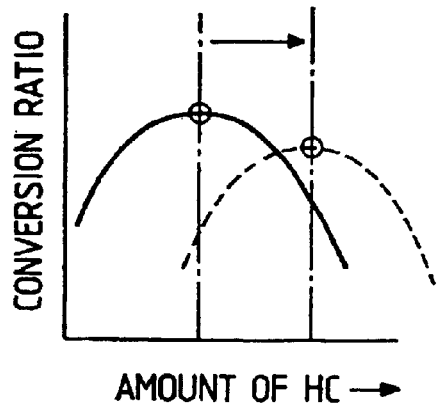
FIG. 3(A) and FIG. 3(B) are graphs showing characteristic of catalyst conversion efficiency.
Figure 3B:
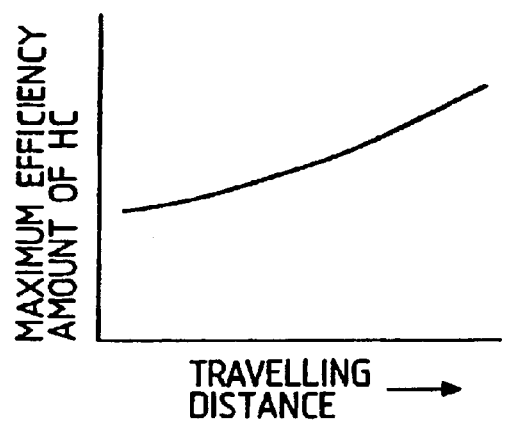

FIG. 2(A) and FIG. 2(B) are graphs indicating characteristics of efficiency of the lean $NO_x$ catalyst to convert $NO_x$ to $N_2$. FIG. 2(A) is a graph indicating a relationship between catalyst temperature and conversion efficiency. The FIG. 2(A) reveals that the catalyst has high efficiency in a certain range of temperature, and that the range of temperature of high efficiency shifts toward a higher temperature range in accordance with deteriorating the catalyst. The above described shift of maximum efficiency temperature is indicated graphically in FIG. 2(B). FIG. 2(B) reveals that the maximum efficiency temperature increases in accordance with increase of travelling distance of the automobile, that is, with increase of the deteriorating degree of the catalyst. A relationship between an amount of HC in the exhaust gas and the conversion efficiency is shown in FIG. 3(A). FIG. 3(A) indicates that there is an optimum amount of HC for obtaining maximum conversion ratio corresponding to an amount of $NO_x$, and a higher conversion ratio can be achieved by controlling the amount of HC so as to be the above optimum amount. However, the optimum amount of HC for achieving the maximum conversion ratio alters depending on deterioration of the catalyst as shown in FIG. 3(B). Therefore, it is revealed that determining deterioration of the catalyst regularly and changing the amount of HC corresponding to the deterioration of the catalyst are necessary.

Figure 4A:
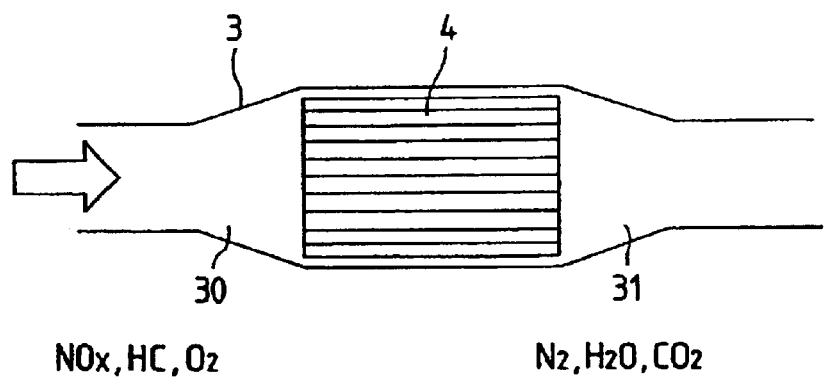
FIG. 4(A) and FIG. 4(B) are schematic illustrations for explaining a principle of eliminating $NO_x$ by the catalyst relating to the present invention.
Figure 4B:
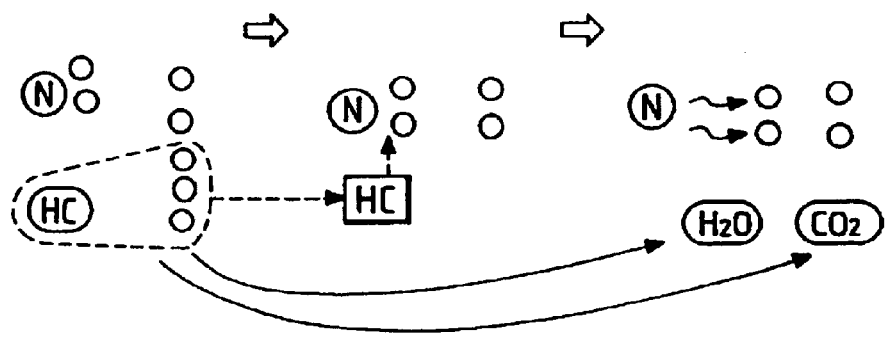

Next, methods for determining conversion ratio of catalyst and deterioration of the catalyst are explained hereinafter. As shown in FIG. 4(A), exhaust gas components, which relates to reducing reactions of $NO_x$, at an engine side 30 of a lean $NO_x$ catalyst 4 which is installed at inside of an exhaust pipe 3 are $NO_x$, HC, and $O_2$. In FIG. 4(B), molecules of gases are schematically illustrated. Nitrogen, non-combustion hydrocarbon, and oxygen are indicated by N, HC, and O, respectively. On a catalyst, HC reacts with oxygen to form an intermediate product (which is indicated by HC surrounded by a rectangular frame) which effects to $NO_x$ to decompose to $N_2$. Accordingly, the exhaust gas at downstream side 31 of the catalyst contains $N_2$, $H_2O$, and CO2 because of reducing the $NO_x$. In this case, oxygen concentration alters before and after the catalyst as shown in FIG. 4(B). Therefore, as one of detecting methods of change in the conversion ratio of the $NO_x$, a method to detect oxygen concentration before and after the lean $NO_x$ catalyst can be proposed.

Figure 5A:
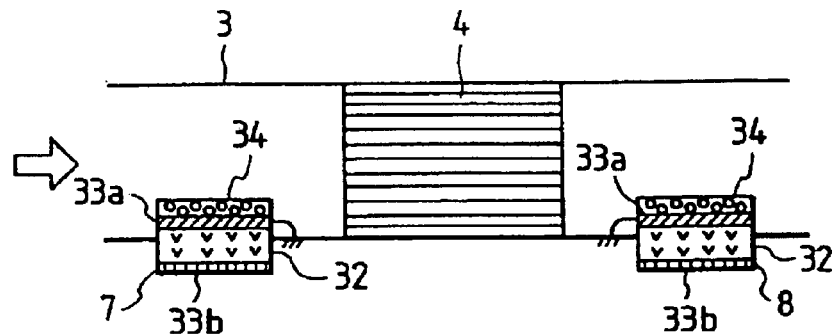
FIG. 5(A) and FIG. 5(B) are schematic illustrations for explaining a principle of detecting deterioration of the catalyst relating to the present invention.
Figure 5B:
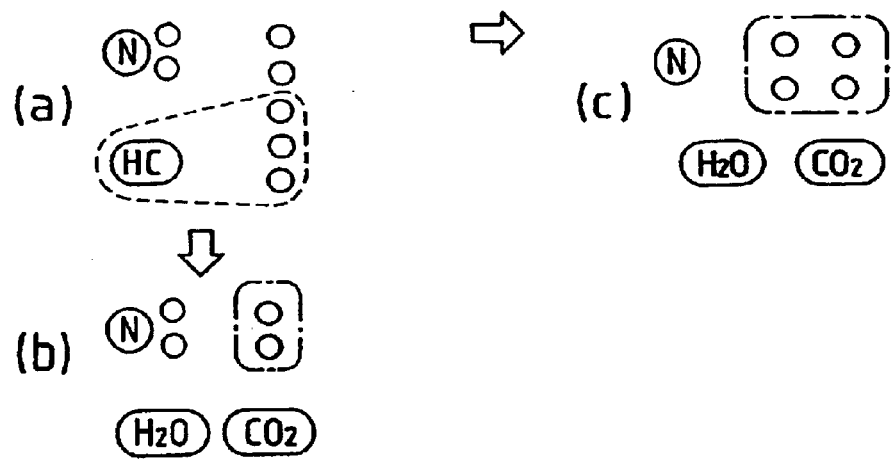
Figure 5C:
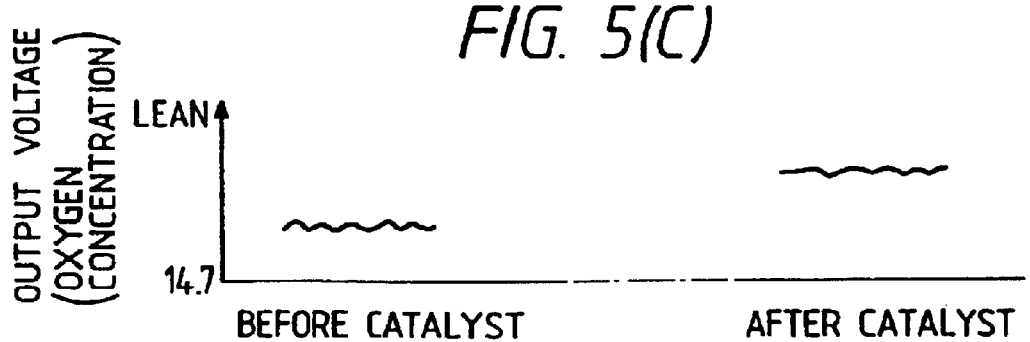
FIG. 5(C) is a graph showing the oxygen concentrations before and after the catalyst.

A principle of detecting oxygen concentration is illustrated in FIGS. 5(A), 5(B), and 5(C). Referring to FIG. 5(A), sensors 7, 8, for detecting oxygen concentration are installed before and after the catalyst, respectively. The sensor 7 for detecting oxygen concentration is composed of platinum electrodes 33a, 33b, which are attached at both sides of a zirconia solid electrolyte 32 respectively. A diffused resistor 34 which regulates gas diffusion is formed on an exhaust gas side of the electrode 33a attached at the exhaust gas side of the electrolyte. The sensor 7 is connected to a casing such as an exhaust pipe 3 and the electrode 33a as a grounding. In this case, when a specified voltage is applied to another electrode, generated electric current becomes proportional to oxygen concentration at the exhaust gas side. That means, the oxygen concentration can be determined by measuring a value of the electric current. Composition and operation of the sensor 8 is the same as that of the sensor 7.

Components of exhaust gas are schematically illustrated in FIG. 5(B). Before reactions at the catalyst, nitrogen, HC, and oxygen coexist as shown in (a). However, HC is almost completely oxidized by a catalytic reaction of platinum on the electrode 33a of the sensor 7. Therefore, detected oxygen concentration is less as much as an amount consumed for the oxidation reaction as shown in (b) as the amount surrounded by one dot chain line in a rectangular frame. Further, because the HC is almost completely reacted and oxygen is generated by decomposition of $NO_x$ by a reducing reaction at downstream side of the catalyst 4, oxygen concentration detected at the downstream side of the catalyst 4 increases more than that of the (b) condition as shown in (c) as the amount surrounded by one dot chain line in a rectangular frame. Accordingly, as a comparison of the amounts of oxygen indicated by rectangular frames in (b) and (c) reveals, detected oxygen concentration before and after the catalyst 4 differ each other. Therefore, signals from the oxygen sensors before the catalyst and the oxygen sensor after the catalyst indicate different values each other as shown in FIG. 5(C).

Figure 6A:
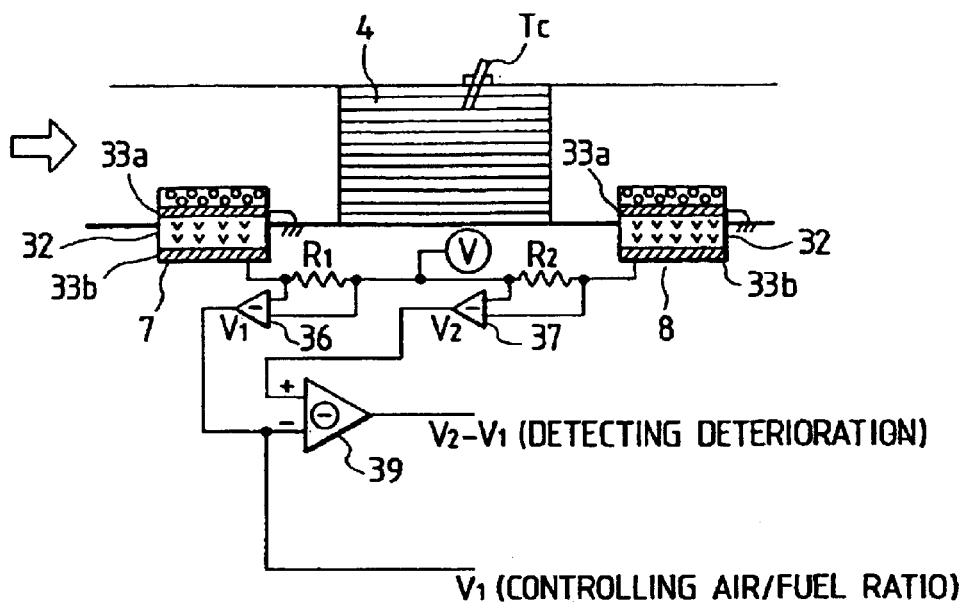
FIG. 6(A) is a schematic illustration for explaining a detecting method relating to the present invention.
Figure 6B:
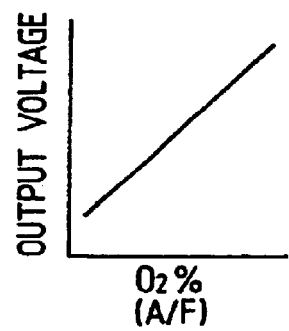
FIGS. 6(B), 6(C), and 6(D) are graphs for explaining the detecting method shown in FIG. 6(A)
Figure 6C:
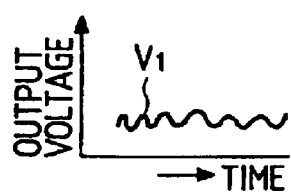
Figure 6D:
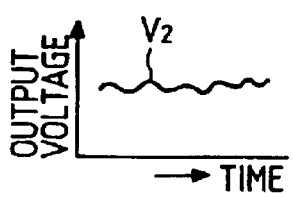

A principle of detecting deterioration or conversion ratio is illustrated in FIGS. 6(A), 6(B), 6(C), and 6(D). FIG. 6(A) illustrates schematically an outline of an apparatus therefor. A specified voltage is applied to the electrode 33b of the sensors 7, 8. At that time, voltage drops V1, V2 of electric current flown through fixed resistors R1, R2 are detected by differential amplifiers 36, 37. These V1, V2 are values of electric current flown through the solid electrolyte 32 of respective sensors 7, 8, that means, detected oxygen concentration. Further, a difference of the V1 and V2 is detected again by a differential amplifier 39. The difference (V1–V2) is a value related to deterioration. The above described sensor changes its output depending on oxygen concentration as indicated in FIG. 6(B), and accordingly, difference of oxygen concentration before and after the catalyst 4 can be detected. The difference of output voltages are shown in FIGS. 6(C) and 6(D). The V2 is higher than V1 as much as difference of oxygen concentration. The output V1 of the sensor 7 before the catalyst can be used concurrently for controlling air-fuel ratio. Naturally, the output V2 of the sensor 8 after the catalyst also can be used concurrently for controlling air-fuel ratio.

In the present embodiment, the difference of V1 and V2 is detected by a differential amplifier, but the difference can be obtained by taking V1, V2 into a microcomputer after converted by an analog-digital convertor and calculating the difference by a calculating process. A flow chart for the calculation is explained hereinafter.

Figure 7A:
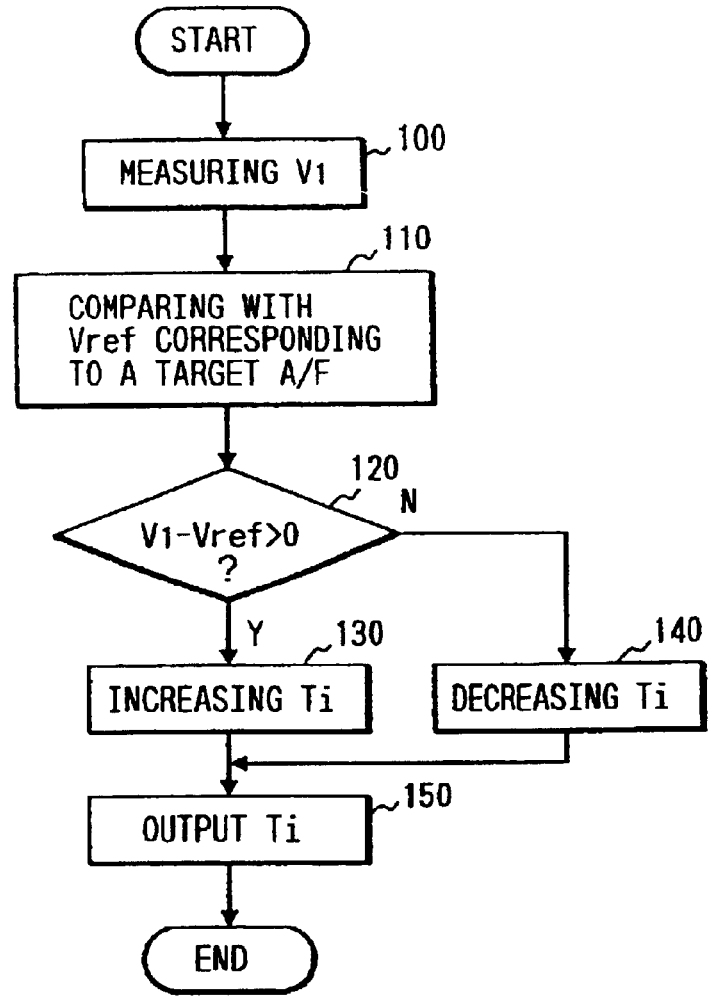
FIG. 7(A) is a flow diagram relating to the present invention.
Figure 7B:
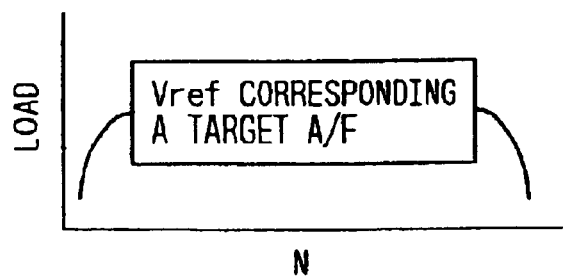
FIG. 7(B) is a schematic graph for explaining the flow diagram shown in FIG. 7(A)

First, a flow chart for controlling air-fuel ratio is shown in FIG. 7(A). The V1 is measured at step 100, and a target output $V_{ref}$ of the sensor corresponding to a target air-fuel ratio (A/F) as shown in FIG. 7(B) is retrieved from a map of engine rotation N and load at step 110. The V1 is compared with the $V_{ref}$ at step 120. If the V1 is larger than $V_{ref}$, the air-fuel ratio at the time is judged as in a leaner side than the target air-fuel ratio, and an amount of fuel injection Ti is increased at step 130 so as to shift the air-fuel ratio to a rich side. If the V1 is smaller, the air-fuel ratio at the time is judged as in a richer side than the target air-fuel ratio, and an amount of fuel injection Ti is decreased at step 140 so as to shift the air-fuel ratio to a lean side. As described above, T is determined and output to a fuel injection valve 19 at step 150. In a manner as described above, controlling of air-fuel ratio can be realized by using sensors for detecting conversion ratio or deterioration.

Next, a flow chart for detecting deterioration of catalyst is shown in FIG. 8. At step 210, V1 and V2 are measured and a difference of the V1 and the V2 is calculated. If the difference is smaller than a specified value at step 220, oxygen increase by reducing reaction of $N_2$ by the catalyst is judged as small at step 230 and the catalyst is estimated to be deteriorated. That is, the catalyst is judged to be deteriorated and a deterioration degree is indicted. The larger difference of oxygen concentration before and after the catalyst, that is, the larger difference between V1 and V2 means a stronger reducing reaction of the catalyst and indicates that the catalyst is not deteriorated yet.

A deterioration judging method improved in accuracy is indicated in FIG. 9. The difference between V1 and V2 is calculated at step 300, and catalyst temperature Tc or exhaust gas temperature is judged whether the temperature is in a specified range or not at step 310. Because the conversion ratio of the catalyst varies depending on temperature as shown in FIG. 2(A), and there may be a possibility to judge the catalyst to be deteriorated erroneously when the catalyst temperature changes. Therefore, the deterioration judgement of the catalyst is performed only at the time when the catalyst temperature exists in a specified range. Furthermore, the above described method is effective in a point that temperature dependency of characteristics of the sensor can be ignored. The deterioration judgement on the catalyst after the catalyst temperature is confirmed to be in a specified range is performed by the same steps as shown in FIG. 8. That is, when a difference between V2 and V1 obtained at step 320 is lower than a reference value, the catalyst is judged as deteriorated at step 330, and a deteriorating degree corresponding to the difference between V2 and V1 is indicated at step 340.

Figure 10A:
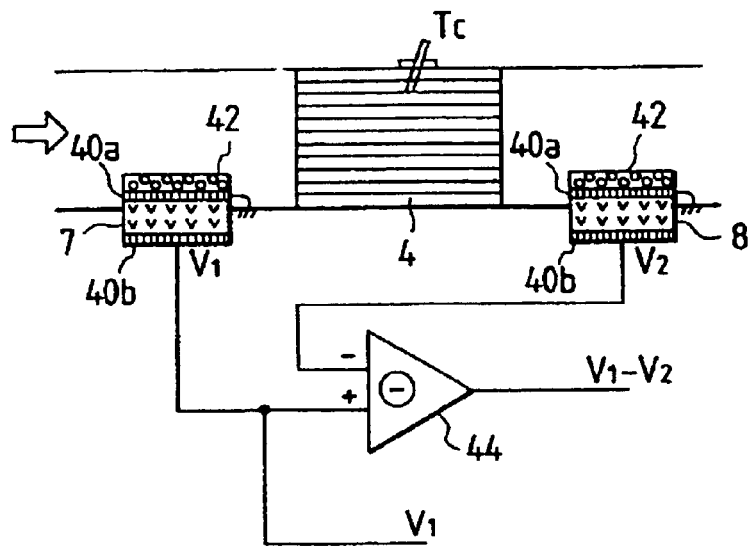
FIG. 10(A) is a schematic illustration for explaining another detecting method relating to the present invention.
Figure 10B:
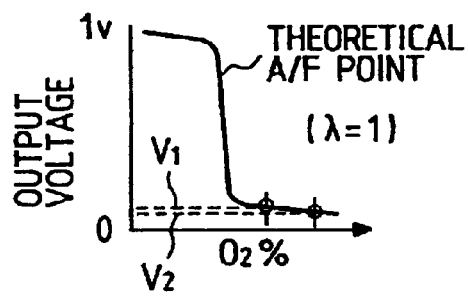
FIGS. 10(B), 10(C), and 10(D) are graphs for explaining the detecting method shown in FIG. 10(A)
Figure 10C:
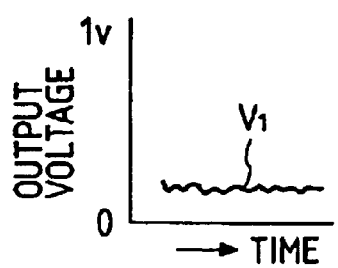
Figure 10D:
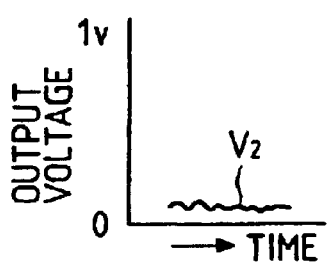

Next, another detecting method is shown in FIGS. 10(A), 10(B), 10(C), and 10(D). A sensor used in the present method is an oxygen sensor having a non-linear output characteristics corresponding to oxygen concentration (air-fuel ratio) as shown in FIG. 10(B). In a case using such a sensor as above described, a simple diffused film 42 can be used sufficiently as the diffused film provided at surface of an electrode 40a in an exhausted gas side of the each sensor 7, 8. Concretely saying, a thinner diffused film than the diffused film 34 shown in FIG. 5 can be used. The apparatus shown in FIG. 10(A) uses such oxygen sensors as the ones having two values type output. With the above sensor, the electrode 40a at the exhaust gas side is connected to a ground, and voltages (electromotive force) V1, V2 generated at the other electrode 40b are measured. Based on the difference between the voltages of the two sensors, the deteriorating degree is detected. Concretely saying, V1 and V2 are measured when the exhaust gas is more lean than a theoretical air-fuel ratio, and the difference between the outputs is determined by a differential amplifier 44. However, the difference can be calculated by taking the outputs into a microcomputer as previously explained. Based on the difference, a deteriorating degree of the catalyst is estimated. Examples of the outputs, V1, V2, are illustrated in FIGS. 10(C) and 10(D). The output after the catalyst, V2, has less value than the output before the catalyst as shown in FIGS. 10(D) and 10(C), respectively, because the exhaust gas after the catalyst contains more oxygen relatively than the exhaust gas before the catalyst. The difference between V1 and V2 becomes an index indicating the deteriorating degree of the catalyst.

Embodiment 2

Figure 11:
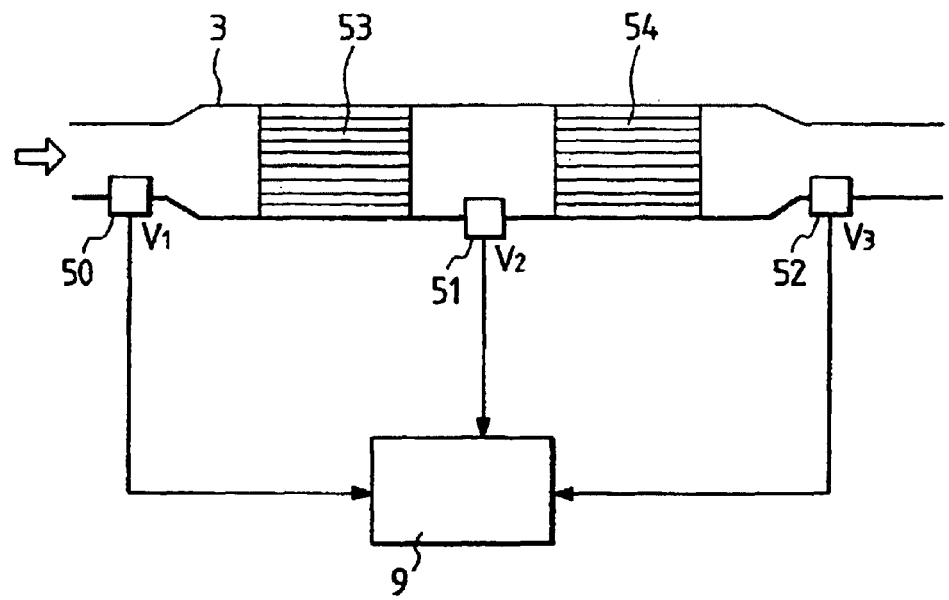
FIG. 11 is a schematic illustration of a detecting apparatus relating to the present invention.
Figure 12:
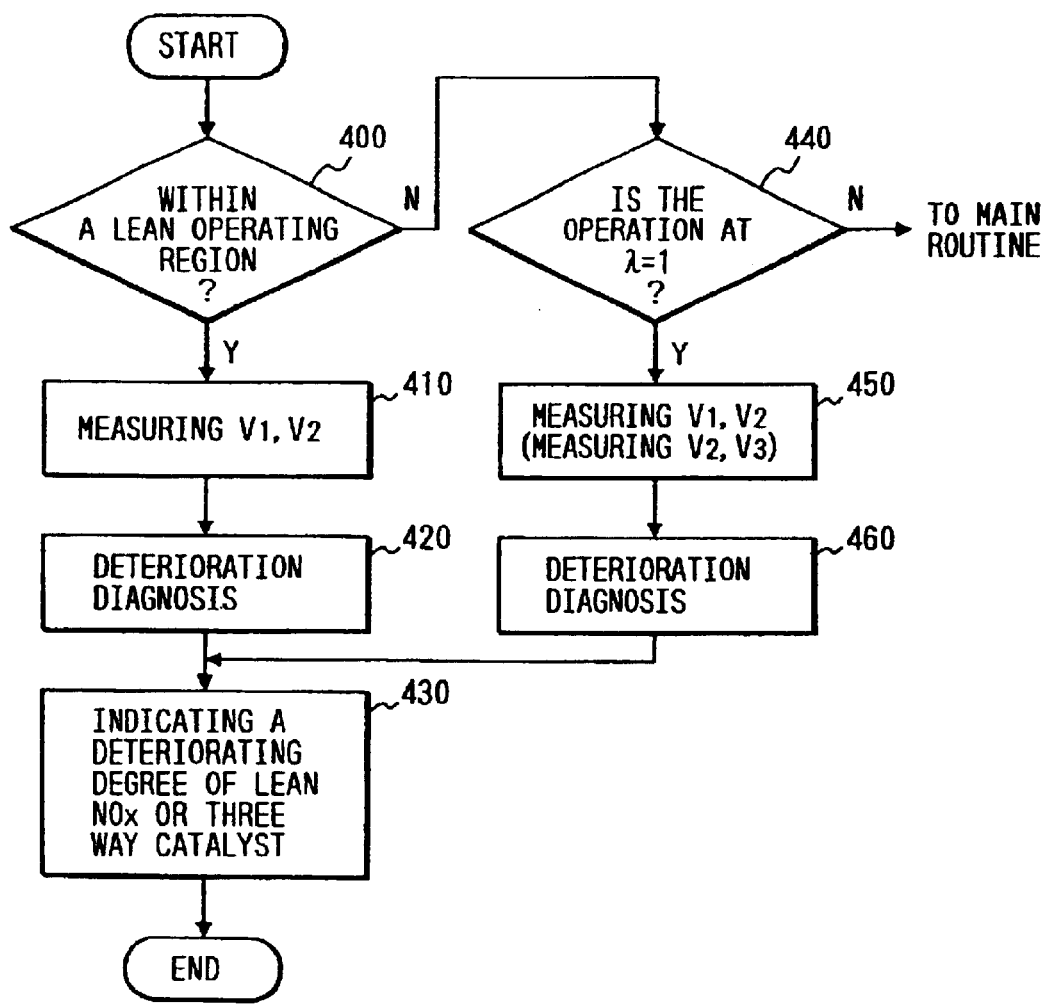
FIG. 12 is a flow diagram for controlling the detecting apparatus shown in FIG. 11.

Further, another embodiment of the present invention is shown in FIG. 11. In the present embodiment, a prefixed catalyst 53 and a postfixed catalyst 54 in a downstream side were arranged in series, and three sensors, 50, 51, 52 were installed. Efficiency and a deteriorating degree of the prefixed catalyst 53 are determined by the method explained in the previous embodiment using the sensors 5, 51. Efficiency and a deteriorating degree of the postfixed catalyst 54 are determined by the method explained in the previous embodiment using the sensors 51, 52, or sensors, 50, 52. In accordance with the above described arrangement, deterioration diagnosis of a complex catalyst system becomes possible. As for the catalyst, a $NO_x$ reducing catalyst is used for the prefixed catalyst 53 and a three way catalyst or an oxidizing catalyst is used for the postfixed catalyst 54. In this case, a deteriorating degree of the $NO_x$ reducing catalyst 53 is determined by comparing detected outputs of the sensors 50 and 51 as previously explained. A deteriorating degree of the postfixed catalyst 54 can be determined using signals from the sensors 51 and 52, or sensors 50 and 52. The signals from the sensors 50, 51, 52 are taken into a microcomputer 9, and are processed for calculation. A controlling flow chart in this case is shown in FIG. 12.

The $NO_x$ reducing catalyst 53 is effective as a $NO_x$ eliminating catalyst in a lean operating region, and accordingly, judging first whether the catalyst is within the lean operating region at step 400. When the catalyst is judged as within the lean operating region, a diagnosis mode starts. That is, signals V1, V2 from the sensors 50, 51 before and after the catalyst 53 respectively are determined at step 410, and the diagnosis of deterioration is performed at step 420. For this diagnosis, flow charts shown in FIGS. 8 and 9 are used. Subsequently, a deteriorating degree of the catalyst is indicated at step 430.

In a case of the postfixed catalyst, a deteriorating degree is judged when the catalyst is within an operating region with an excess air factor λ=1 at step 440. Signals V1, V3 from the sensors 50, 52 in the above described operating region are determined at step 450, and the diagnosis of deterioration is performed at step 460 based on the above signals. In this case, the deterioration of the catalyst can also be judged by measuring outputs V2, V3 from the sensors 51, 52 in a same manner.

As explained above, diagnosis of efficiency or deterioration of a complex catalysis system using a plurality of catalysts can be performed preferably when each of the catalysts is within an operation region.

Embodiment 3

Figure 13:
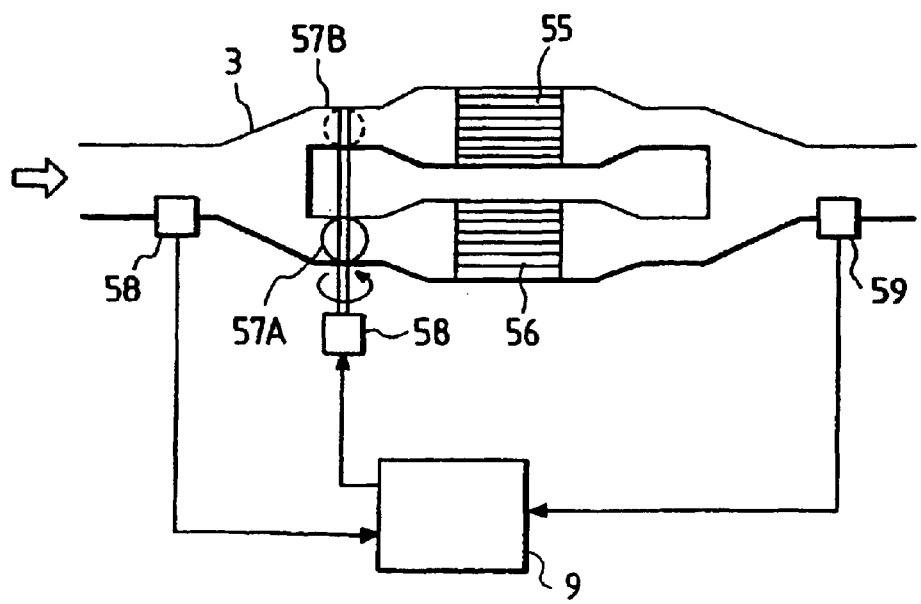
FIG. 13 is a schematic illustration of another detecting apparatus relating to the present invention.

Furthermore, another embodiment of the present invention is illustrated in FIG. 13. In this case, a plurality of catalysts are arranged in parallel. Catalysts 55, 56 are arranged in parallel, and a catalyst to which exhaust gas is flowed is selectively alterable depending on its operating condition by switching valves 57A, 57B driven by an actuator 58 which is operated by loads or electric power. For instance, when the switching valve 57A is open so as to flow the exhaust gas to the catalyst 56, the switching valve 57B is close so as not to flow the exhaust gas to the catalyst 55. In this case, efficiency or deterioration of the catalyst 56 must be judged based on signals from the sensors 58, 59 when the operating condition is such that the catalyst 56 must work. When the switching valves 57A, 57B are rotated so as to flow the exhaust gas to the catalyst 55, the exhaust gas flow to the catalyst 56 is stopped. In this case, efficiency or deterioration of the catalyst 55 must be judged based on signals from the sensors 58, 59 when the operating condition is such that the catalyst 55 must work. Operation of the actuator 58, intake of signals from the sensors 58, 59, and processing are performed by a microcomputer 9.

A flow chart for the above processing is shown in FIG. 14. A case when one of the catalysts shown in FIG. 13 is a $NO_x$ reducing catalyst, and another catalyst is a three way catalyst or an oxidizing catalyst is explained hereinafter. First, the operating condition is judged whether within a lean operating region or not at step 500. When the operating condition is within the lean operating region, the switching valve 57A is operated so as to supply exhaust gas to the $NO_x$ reducing catalyst at step 510. Subsequently, after the operating condition is adequately established, signals from the sensors 58, 59 are measured at step 520, diagnosis of deterioration is performed on the $NO_x$ reducing catalyst at step 530, and results of the diagnosis are indicated at step 540. When the operating condition is without the lean operating region, the switching valve 57A is closed and the switching valve 57B is opened reversely so as to flow the exhaust gas to the three way catalyst at step 550. Subsequently, the operating condition is judged whether it is with a theoretical air-fuel ratio λ=1 or not at step 560. When λ=1, signals from the sensors 58, 59 are measured at step 570, diagnosis of deterioration is performed on the three way catalyst at step 580, and results of the diagnosis are indicated at step 540.

Embodiment 4

Figure 15A:
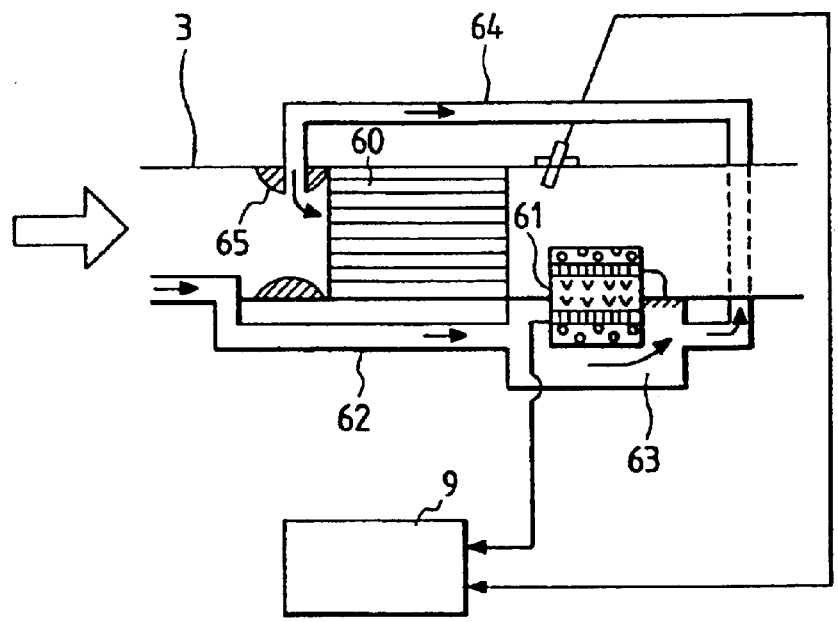
Figure 15B:
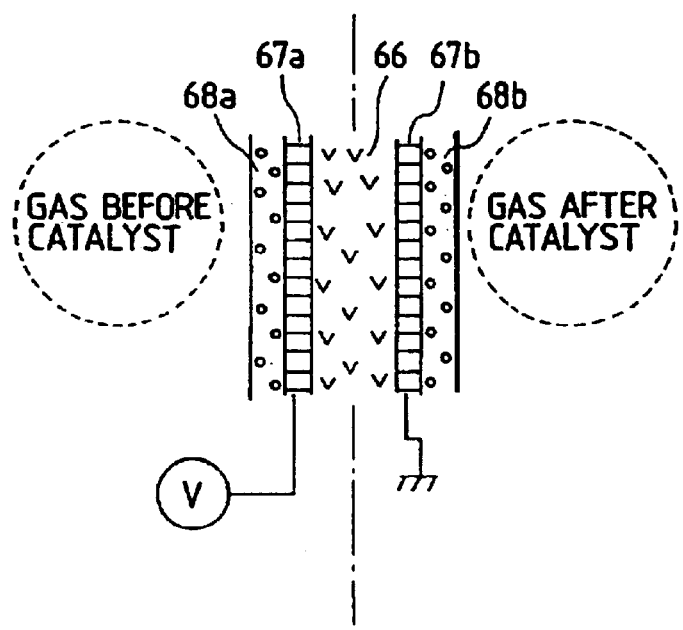

Furthermore, another embodiment of the present invention is shown in FIG. 15. In the present embodiment, a sensor 61 is so composed that the exhaust gas at upstream side of the catalyst 60 is supplied to one plane of the sensor 61 and the exhaust gas at downstream side of the catalyst 60 is supplied to another plane of the sensor 61 in order to determine a difference of oxygen concentration in the exhaust gas at upstream side and the exhaust gas at down stream side with only one sensor. In this case, almost exhaust gas in an exhaust pipe 3 flows to the catalyst 60. However, a small portion of the exhaust gas flows through a path 62 to a chamber 63 which is provided at one side of the sensor 61. The exhaust gas further flows through a path 64 by a sucking effect of a Venturi 65 which is provided at upstream side of the catalyst. On the other hand, the exhaust gas after the catalyst 60 is led into an exhaust pipe side of the sensor 61. A structure of the sensor 61 is indicated in FIG. 15(B). In FIG. 15(B), the exhaust gas at upstream side of the catalyst is led to left side of the sensor, and the exhaust gas at downstream side of the catalyst is led to right side of the sensor. The sensor is composed of a zirconia solid electrolyte 66 having platinum electrodes 67a, 67b at both sides, and porous protecting films 68a, 68b are provided outside each of the electrodes. The both sides of the solid electrolyte 66 have catalytic effects and can oxidize HC. In accordance with the structure, the solid electrolyte 66 can determine residual oxygen concentration after the above oxidation. In this case, the solid electrolyte, which is a kind of oxygen concentration cell, is preferable because only a difference of oxygen concentrations between the concentration at one side and at the other side of the solid electrolyte is required. Furthermore, if the electrode 67b at one side is connected to ground, an electric potential measured at the other electrode 67a indicates the difference of oxygen concentration. The measured electric potential is taken into a microcomputer 9, and is processed.

Figure 16A:
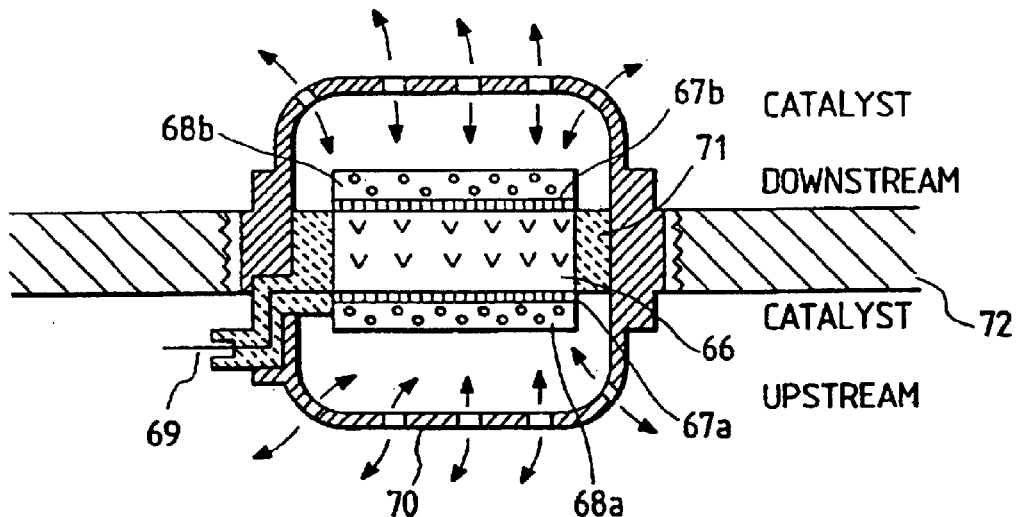
FIG. 16(A) is a cross section of a detecting sensor used in the detecting method shown in FIG. 15(A), FIGS. 16(B) and 16(C) are graphs for indicating characteristics of the detecting sensor shown in FIG. 16(A)
Figure 16B:
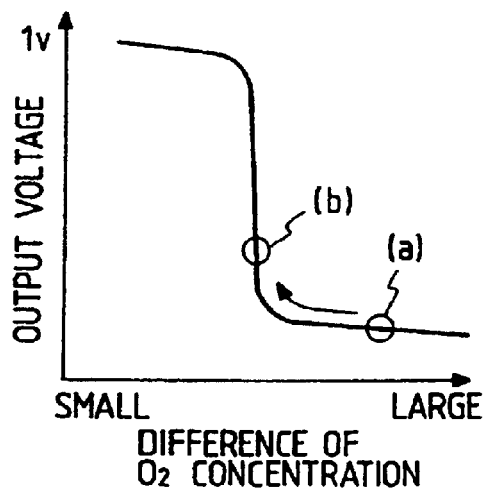
Figure 16C:
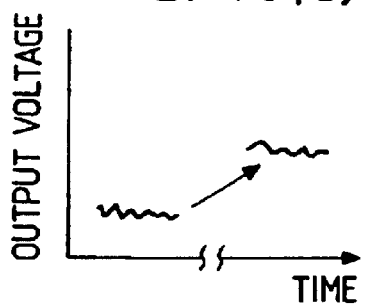

More detailed structure of the sensor 61 is indicated in FIG. 16(A). The sensor is arranged in a protecting tube 70. The electrode 67b at downstream side of the exhaust gas from the catalyst is connected to ground by the protecting tube 70 through a wire printed on an insulator 71. The other electrode 67a at upstream side of the exhaust gas to the catalyst is led to outside through a connector portion 69. The sensor body itself is screwed and fixed at the exhaust pipe 72. In accordance with the above described composition, the exhaust gas before and after the catalyst can be introduced to each of the sides of the sensor. The sensor, a kind of oxygen concentration cell, has a characteristics shown in FIG. 16(B) depending on the difference of oxygen concentrations between those at each side of the sensor. During a period when the catalyst is not deteriorated, oxygen concentration in the downstream of the exhaust gas from the catalyst is large because oxygen in $NO_x$ is reduced to oxygen molecules as shown in FIG. 5. When the difference of oxygen concentration between those at each side of the sensor is large, an output voltage of the sensor is low as shown by a point (a) in FIG. 16(B). On the contrary, when the difference of oxygen concentration between those at each side of the sensor is small, the output of the sensor increases because of generating electromotive force in the solid electrolyte 66 as shown by a point (b) in FIG. 16(B). Accordingly, the output from the sensor increases with elapsing time as shown in FIG. 16 (C). Therefore, deterioration of the catalyst can be detected by measuring the output of the sensor. As described above, when the deterioration of the catalyst is detected by only one sensor, accuracy of the detection can be improved because temperatures of detecting sides of the sensor are identical and temperature dependency of the sensor can be eliminated.

Figure 17:
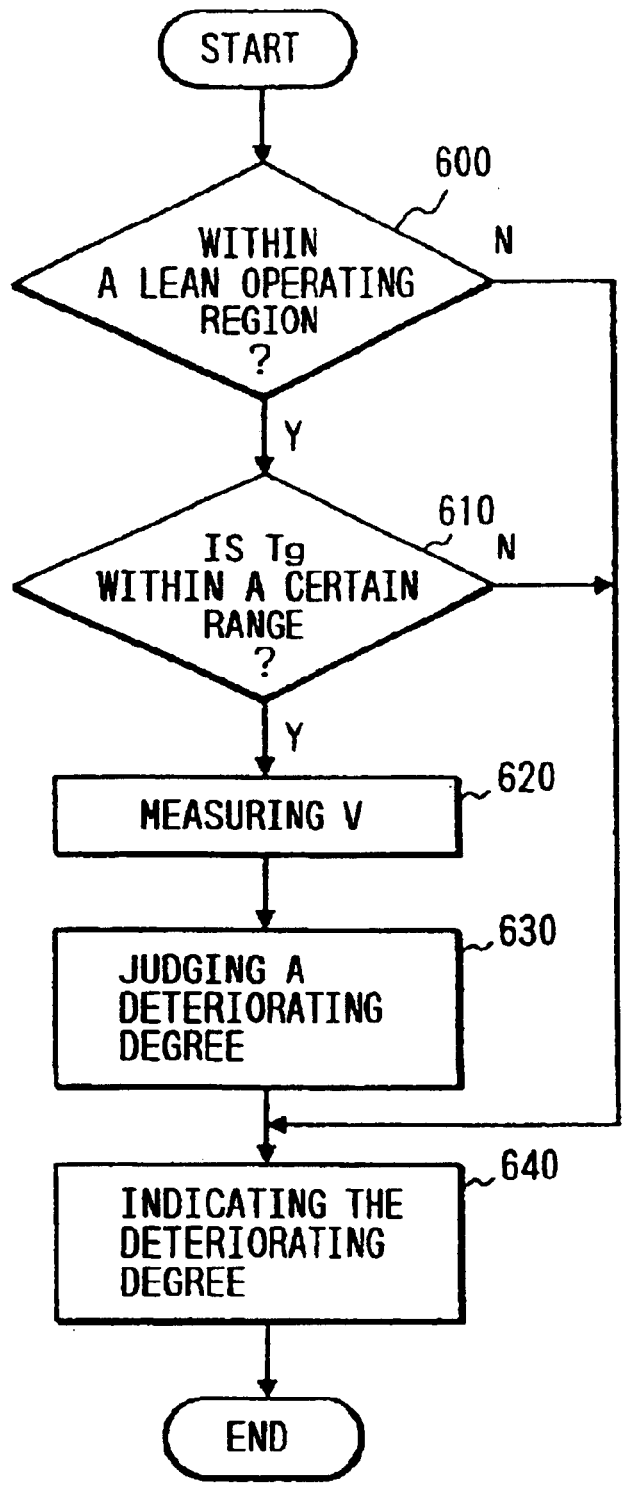
FIG. 17 is a flow diagram for control in the detecting method shown in FIG. 15(A)

A flow chart for detecting deterioration of catalyst is shown in FIG. 17. First, the operating condition is judged whether within a lean operating region or not at step 600. When the operating condition is within the lean operating region, further, the exhaust gas temperature Tg is judged whether it is within a specified range or not at step 610. When the temperature is within the specified range, the sensor is being activated, and temperature dependency of the catalyst can be eliminated. As described above, no heater for the sensor becomes necessary by choosing temperature range necessary for sensor activation as for the specified temperature range. Subsequently, an output from the sensor is measured at step 620, and a deterioration degree is judged at step 630. This judgement can be performed only by judging the output from the sensor is over or below a reference value. A deteriorating degree is judged and indicated at step 640.

Embodiment 5

Figure 18:
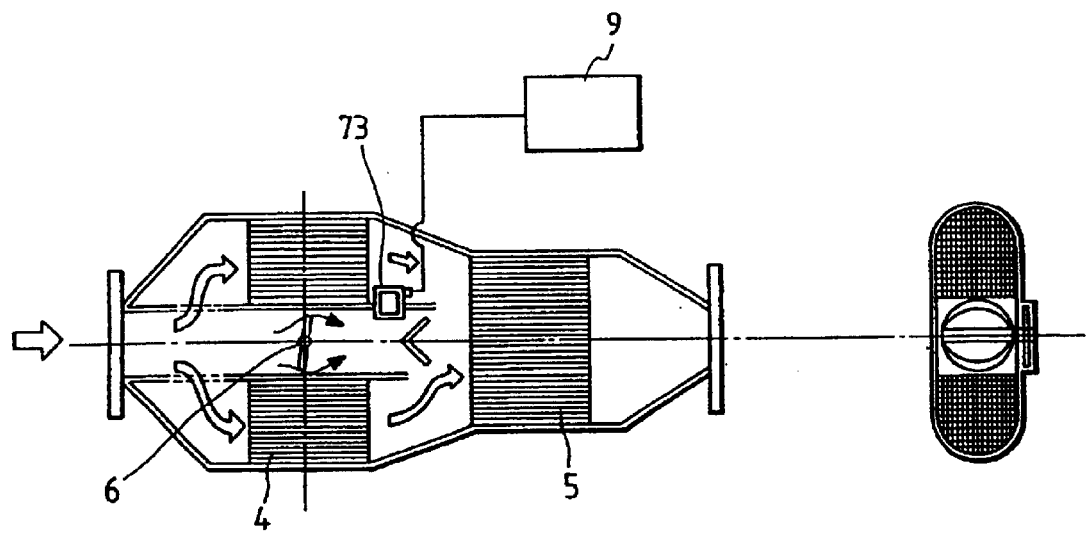
FIG. 18 is a schematic illustration for explaining another detecting method relating to the present invention.

Further, another embodiment of the present invention is shown in FIG. 18. Under a lean operating condition, exhaust gas flows into a $NO_x$ reducing catalyst 4 by closing a switching valve 6, and subsequently the exhaust gas flows into a three way catalyst 5 which is located at downstream side. In this case, the switching valve 6 is made in a manner to leak a small amount of gas so that the exhaust gas at upstream side flows into both a sensor 73 as shown in FIG. 16(A) and a catalyst 4. The exhaust gas at downstream side of the catalyst 4 flows through another side of the sensor 73. Signals from the sensor are taken into a microcomputer 9 and processed. When the switching valve 6 is opened, the exhaust gas does not flow into the $NO_x$ reducing catalyst 4, but flows only into the three way catalyst.

Embodiment 6

Figure 19:
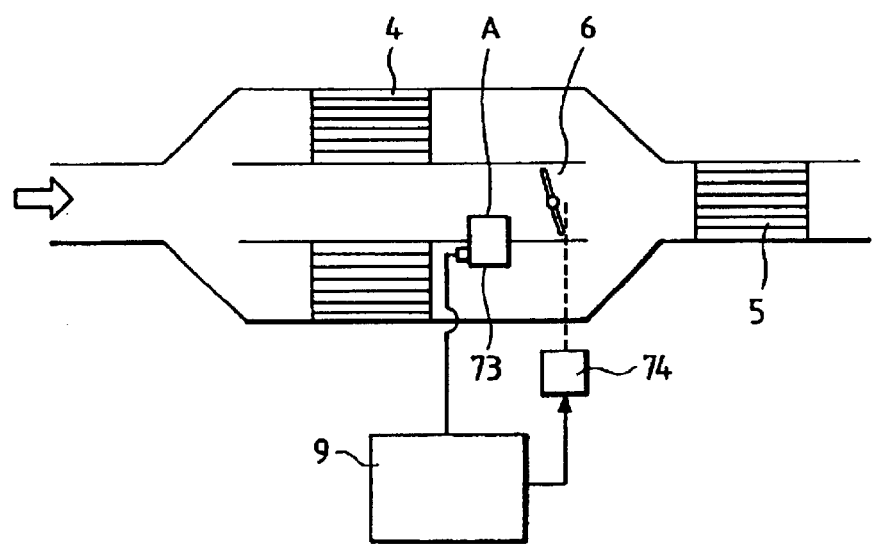
FIG. 19 is a schematic illustration for explaining another detecting method relating to the present invention.

Furthermore, another embodiment of the present invention is shown in FIG. 19. In this case, a sensor 73 as shown in FIG. 16(A) is arranged at upstream side of a switching valve 6. The switching valve 6 is operated by a driving apparatus 74 which is controlled by signals from a microcomputer 9. Exhaust gas before and after a catalyst 4 is introduced into the sensor 73. The switching valve is arranged at downstream side of the sensor 73 so that the exhaust gas at downstream side of the catalyst 4 does not flow into a side of the sensor 73 for the exhaust gas at upstream side of the catalyst 4.

Embodiment 7

Figure 20:
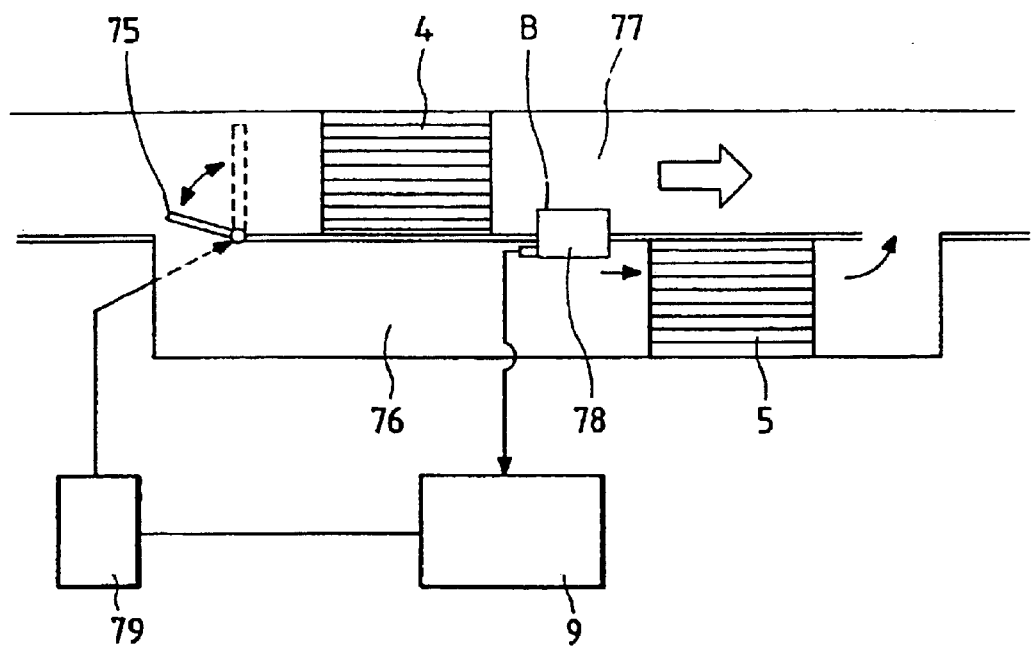
FIG. 20 is a schematic illustration for explaining another detecting method relating to the present invention.

Furthermore, another embodiment of the present invention is shown in FIG. 20. Under a lean operating condition, a switching valve 75 is opened so that exhaust gas flows into a $NO_x$ reducing catalyst 4. In this case, exhaust gas at downstream side of the catalyst 4 flows to a side of a sensor 78 for the exhaust gas at downstream side of the catalyst 4. However, because a small amount of gas leaks through the switching valve 75 to an exhaust pipe 76, the exhaust gas at upstream side of the catalyst 4 flows to a side of a sensor 78 for the exhaust gas at upstream side of the catalyst 4. Under an operating condition other than the lean operating condition, the switching valve 75 is switched in a manner as shown by a dotted line in FIG. 20 so that the exhaust gas flows to an exhaust pipe 76. A three way catalyst 5 is arranged in the exhaust pipe 76. In accordance with the structure described above, deterioration of the catalyst can be detected by only a sensor.

Embodiment 8

Next, an embodiment of the present invention relating to an engine controlling method for detecting deterioration of catalyst and efficiency of the engine, and subsequently for improving the efficiency.

Figure 21:
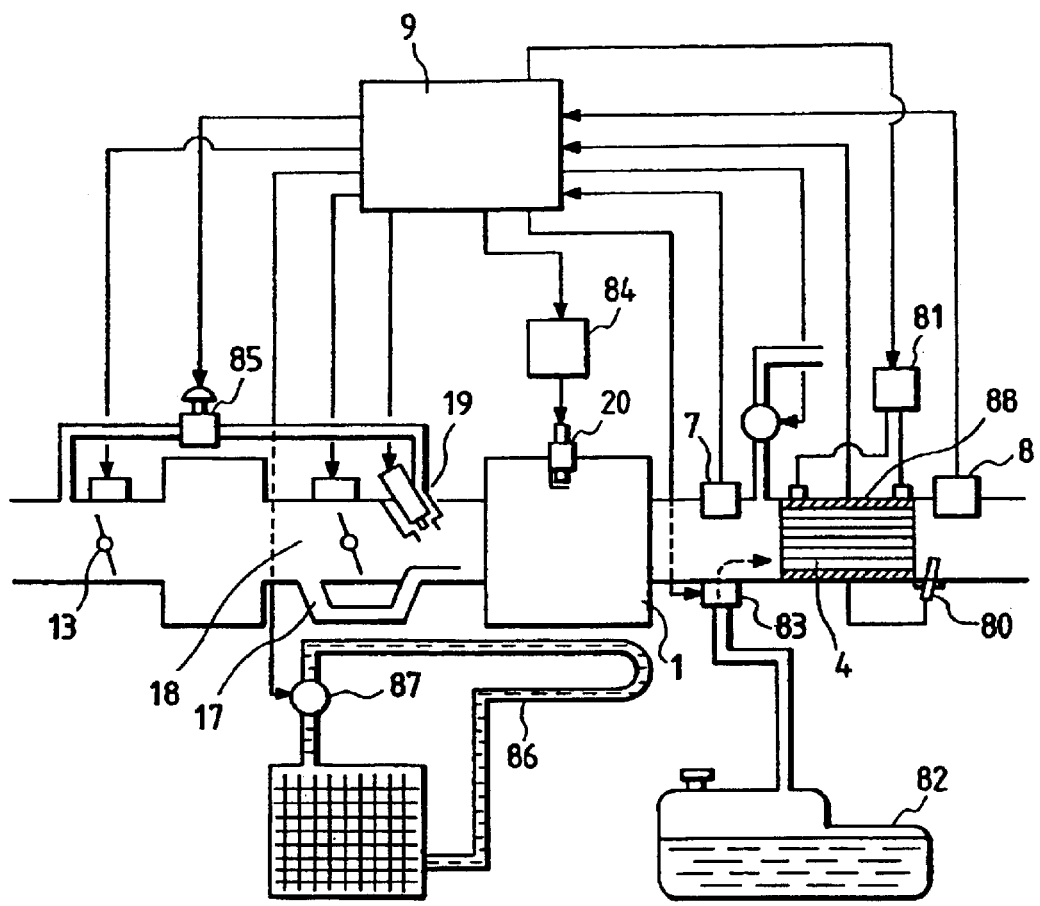
FIG. 21 is a simplified diagrammatic view showing a total system of another embodiment of the present invention.

FIG. 21 is a simplified diagrammatic view of a total system used for the above engine controlling method. Sensors 7, 8 are provided before and after a catalyst 4. A sensor 80 for detecting gas temperature is provided at an exhaust pipe. It is necessary to control catalyst temperature and HC concentration so as to obtain maximum efficiency of the catalyst as shown in FIG. 2 after judging deterioration of the catalyst based on outputs from the sensors 7, 8.

Methods for controlling the catalyst temperature and the HC concentration are explained hereinafter.

One of the methods for controlling the catalyst temperature is a method for regulating circulation of cooling water 86 in engine 1. When circulating amount of the cooling water is decreased by regulating a control valve 87, combustion temperature of the engine 1 is elevated and, accordingly, exhaust gas temperature is also elevated. That means, when the catalyst is judged as deteriorated, the circulating amount of cooling water is regulated to elevate the exhaust gas temperature so as to prevent lowering the efficiency of the catalyst. Another method for controlling temperature is a method for regulating ignition timing of an ignition apparatus 84 and an ignition plug 20. Delayed ignition timing elevates the exhaust gas temperature. That means, when the catalyst is deteriorated, the ignition timing is delayed to elevate the exhaust gas temperature so as to prevent lowering the efficiency of the catalyst. Further, because a required amount of HC changes depending on deterioration of the catalyst, the amount of HC must be increased when the catalyst is deteriorated.

Next, methods for increasing the amount of HC are explained hereinafter.

An exhausted amount of HC changes in accordance with change of fuel injection timing of an injection valve 19. Therefore, when the catalyst is deteriorated, a setting of fuel injection timing is changed by a controller 9. Further, when the injection valve 19 is an air assist injection valve which atomizes fuel by a jet stream, an exhausted amount of HC increases by reducing or stopping of the air assist because fuel atomization becomes incomplete. When a flow dividing valve 18 is closed so that intake gas flows through a swirl path 17, swirling currents are generated in a combustion chamber and combustion is improved. Therefore, on the contrary, an amount of air flow flowed through paths other than the swirl path is increased by making the flow dividing valve 18 a half open, and combustion of fuel becomes incomplete. Accordingly, an exhausted amount of HC is increased. Furthermore, cooling of the engine by increasing circulating amount of cooling water increases the exhausted amount of HC. Further, advanced ignition timing increases the exhausted amount of HC. Therefore, when the catalyst is deteriorated, the ignition timing may be advanced depending on a deteriorating degree of the catalyst. On the contrary, the catalyst temperature and the exhausted amount of HC can be increased by operation at the exhausted gas side. Vaporized fuel components stored at upper portion of inside a fuel tank 82 are supplied by pumping to inside the exhaust pipe at upstream side of the catalyst. As the vaporized fuel components are HC, the efficiency of the catalyst can be improved by supplying the vaporized fuel components to the catalyst. Furthermore, the vaporized fuel components are combustible easily because they are light HC, and the catalyst temperature is elevated by combustion of the vaporized fuel components.

Another method for elevating the catalyst temperature uses an electric heater 88 for heating the catalyst. A driving circuit 81 supplies power to the heater 88 in accordance with signals from the controller 9. The heater elevates the catalyst temperature, and the efficiency of the catalyst is improved. As for the heater, the one, wherein carriers of the catalyst are made from conductive materials and power is supplied to the carrier, may be usable.

Figure 22:
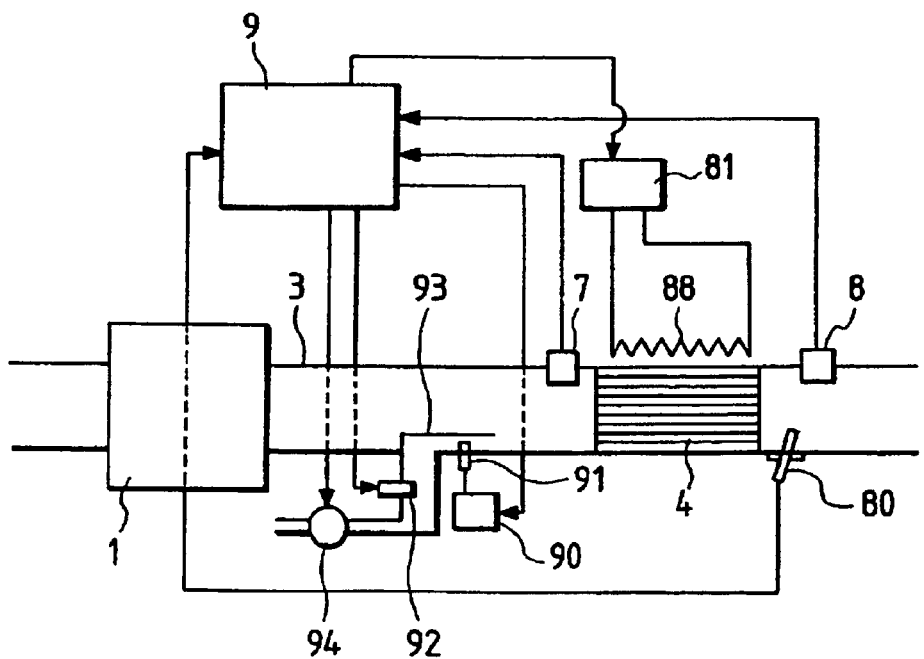
FIG. 22 is a simplified diagrammatic view showing a total system of another embodiment of the present invention.

Another method for altering the catalyst temperature is indicated in FIG. 22. In this method, a structure wherein a burner is installed at inside the exhaust pipe 3 is adopted, and sparks are formed by an ignition plug 91 to which electric voltage is supplied from a driving circuit 81 for ignition apparatus. Fuel is injected into the burner 93 from a fuel injector 92. Air is supplied to the burner 93 by a pump 94. The fuel injected into a chamber 93 is ignited by the ignition plug 91, and flame is formed inside of the exhaust pipe before the catalyst. The catalyst temperature increases by the flame. A structure having an electric heater 88 is also indicated in FIG. 22. The heater 88 is so composed as to wrap outside of the catalyst 4 in order to heat the catalyst effectively. Further, each of the above described methods can be used in a combined manner or independently. That means, any of the above described methods can operate independently.

A flow chart for control is shown in FIG. 23. When deterioration of catalyst is detected at step 710, a judgement whether any changing in an amount of HC is necessary or not is performed based on deteriorating degree of the catalyst at step 720. When the changing in the amount of HC is judged as necessary, an amount of HC to be changed is determined depending on the deteriorating degree of the catalyst at step 730. Subsequently, an amount of HC supply to the catalyst is changed by any one or any combination of HC increasing or decreasing means shown in FIGS. 21 and 22 at step 740. Generally speaking, when $NO_x$ reducing catalyst is deteriorated, HC supply to the catalyst must be increased for ensuring its efficiency. Further, when deterioration of the catalyst is detected at step 710, its deteriorating degree is indicated at step 750.

A flow chart for changing catalyst temperature is shown in FIG. 24. When deterioration of catalyst is detected at step 800, its deteriorating degree is indicated, and a judgement whether any changing in an operating temperature of the catalyst is necessary or not is performed. When the changing is judged as necessary, a necessary changing degree of the operating temperature is decided at step 820, and the catalyst temperature is changed by any one or any combination of temperature changing means shown in FIGS. 21 and 22 at step 830. Subsequently, the catalyst temperature is judged whether it becomes a designated temperature or not, and when it is judged as the designated temperature, the flow of processing is finished.

Figure 25:
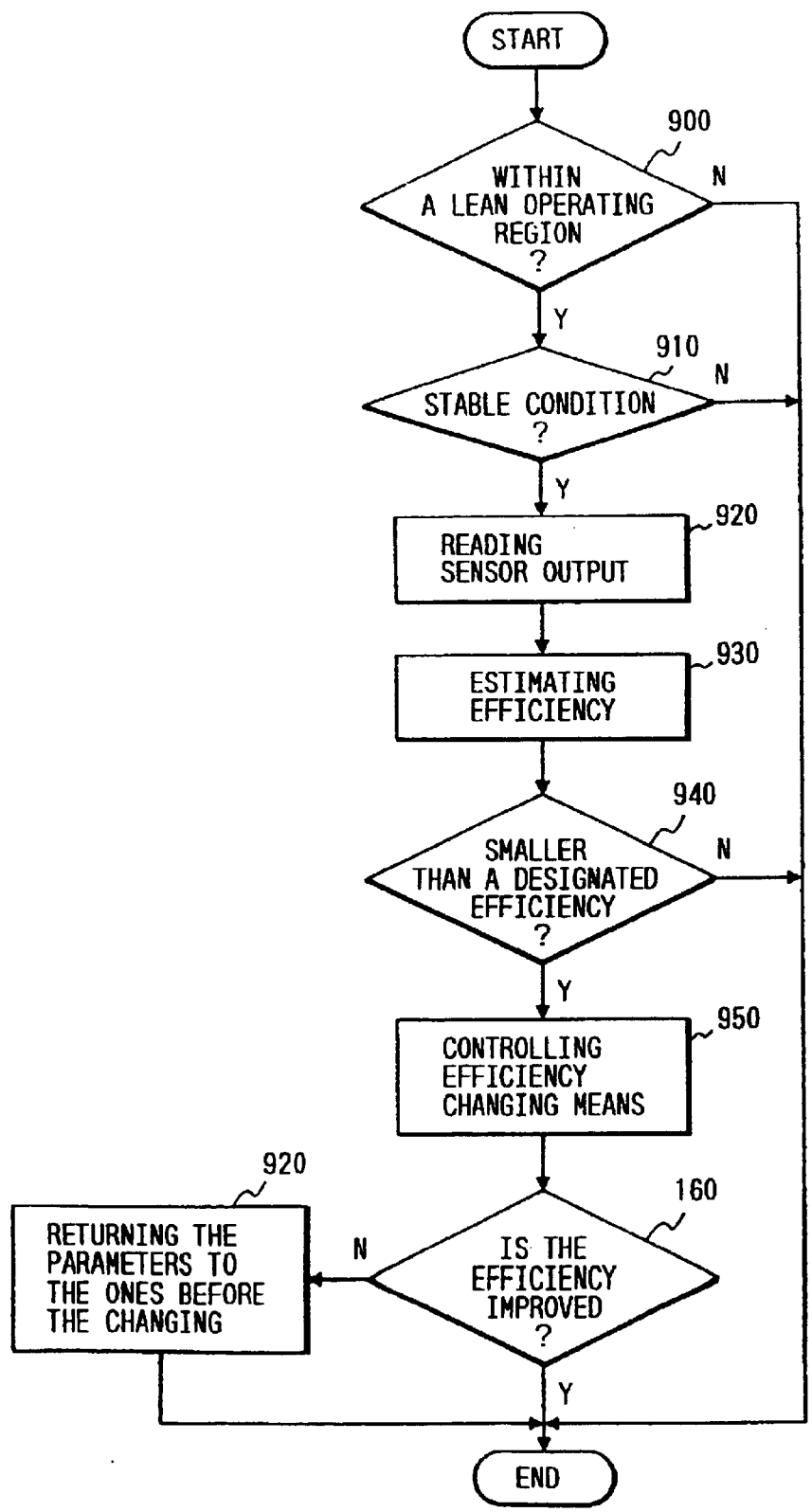
FIG. 25 is a flow diagram for control in the detecting methods shown in FIG. 21 and FIG. 22.

A flow chart for controlling operating conditions so as to maintain the conversion efficiency of catalyst always at maximum is shown in FIG. 25. First, the present operating condition is judged whether within a lean operating region or not at step 900, and when within the lean operating region, it is judged whether in a normal operation or not. When it is in the normal operation within the lean operation region, signals from sensors for measuring efficiency of the catalyst are taken at step 920, and the conversion efficiency of the catalyst is estimated at step 930. When the conversion efficiency of the catalyst is judged as lower than a designated value at step 940, parameters such as catalyst temperature and supplied amount of HC are changed by controlling an efficiency changing means at step 950. Subsequently, the conversion efficiency of the catalyst is judged whether it is improved or not. When it is judged as being improved, the flow of processing is finished in keeping with the changed parameters, and when it is judged as being not improved, the flow of the processing is finished after returning the parameters to the values before changing at the step 970. In accordance with the above described method, an engine can be operated always in a condition with preferable conversion efficiency.

Figure 26A:
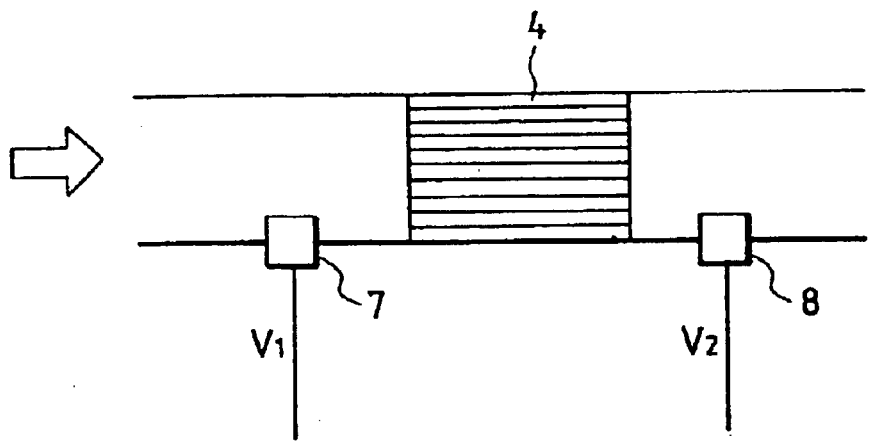
FIG. 26(A) is a schematic illustration for explaining another detecting method relating to the present invention.
Figure 26B:
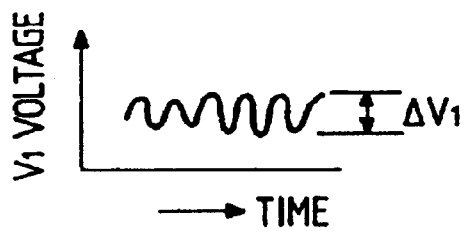
FIGS. 26(B) and 26(C) are graphs for explaining the detecting method shown in FIG. 26(A)
Figure 26C:
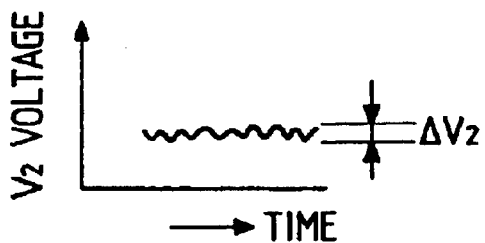
Figure 27:
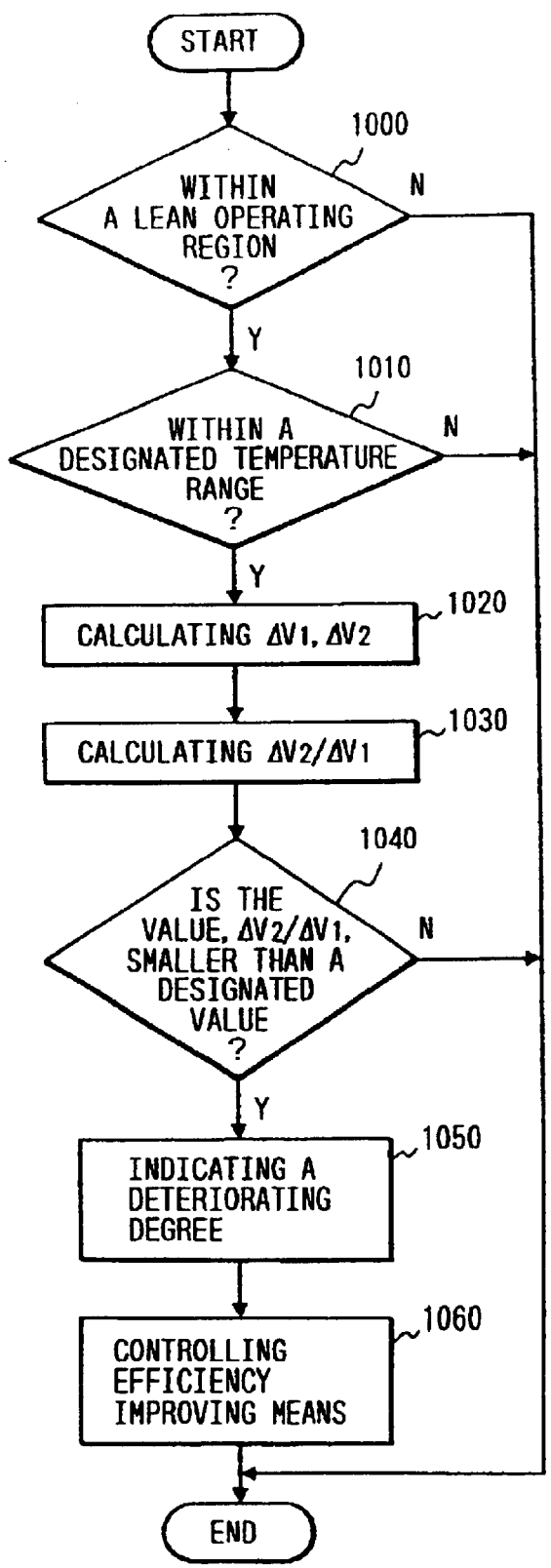
FIG. 27 is a flow diagram for control in the detecting method shown in FIG. 26(A)

Another method for detecting efficiency and deteriorating degree is indicated in FIGS. 26(A), 26(B), and 26(C). In this method, fluctuation width $\Delta V$ of output signals from sensors 7, 8 before and after catalyst 4 as shown in FIG. 26(A) are compared each other. When oxygen concentration in upstream to the catalyst 4 is fluctuating, state of the fluctuation can be determined by the fluctuation width $\Delta V1$ of output signal from sensor 7 as shown in FIGS. 26(B) and 26(C). While the catalyst is new, oxygen concentration in downstream from the catalyst 4 fluctuates significantly because of its active reactivity for $NO_x$ reducing reaction. However, as the catalyst being deteriorated, its reactivity for $NO_x$ reducing reaction decreases and the fluctuation of the oxygen concentration becomes less. Therefore, the fluctuation width $\Delta V2$ of output signal from sensor 8 in downstream after the catalyst 4 becomes small. Accordingly, a deteriorating degree of the catalyst can be determined by measuring changing of the fluctuation width. A flow chart for detecting the deteriorating degree is shown in FIG. 27. Operating condition is judged at step 1000 whether it is within a lean operation region or not, and when the operating condition is judged as within the lean operating region and the catalyst is in a designated temperature range at step 1010, ΔV1 and ΔV2 are detected and calculated at step 1020. Subsequently, ΔV2/ΔV1 is calculated at step 1030. Next, the ΔV2/ΔV1 is judged whether it is smaller than a designated value or not. When it is small, efficiency of the catalyst is judged as decreased at step 1040, the deteriorating degree is indicated at step 1050, and an efficiency improving means starts its operation at step 1060. When only judging the efficiency of the catalyst is required, starting and controlling the efficiency improving means can be omitted.

Figure 28A:
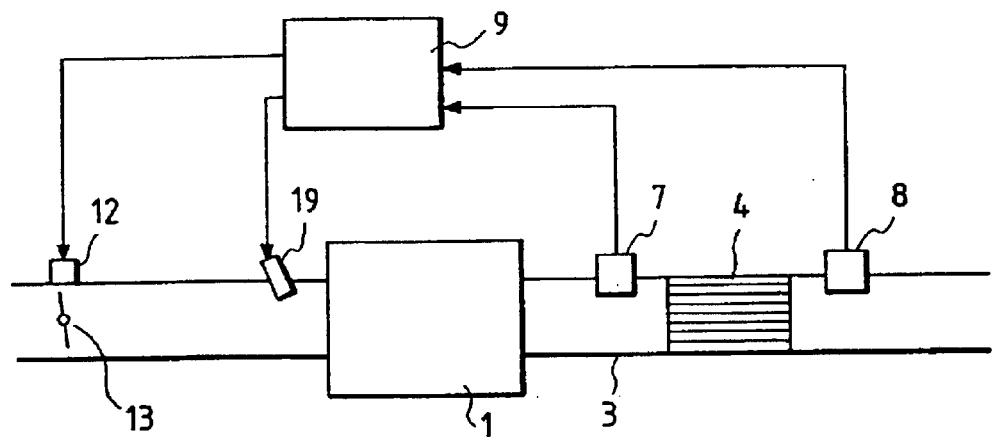
FIG. 28(A) is a schematic illustration for explaining another detecting method relating to the present invention.
Figure 28B:
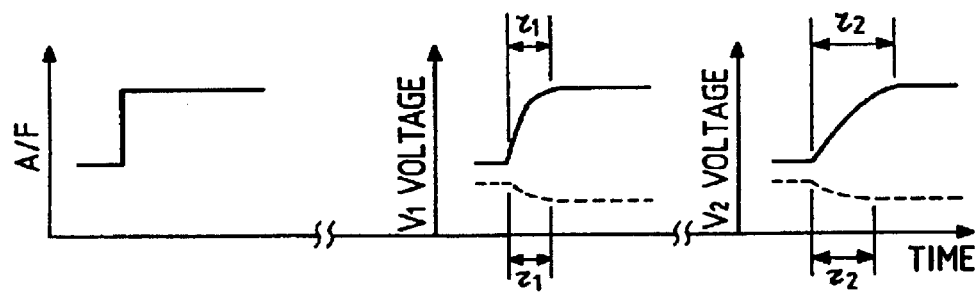
FIGS. 28(B) and 28(C) are graphs for explaining the detecting method shown in FIG. 26(A)
Figure 28C:
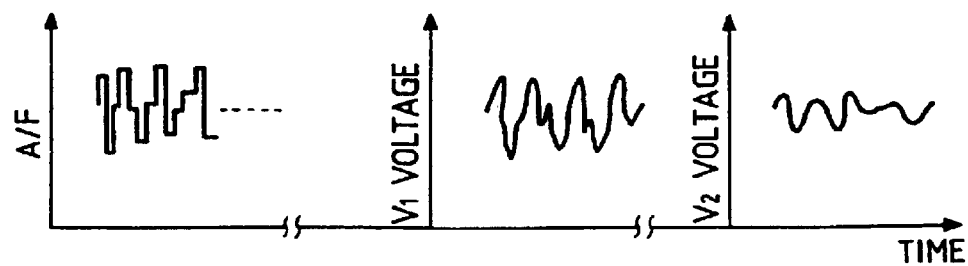
Figure 29:
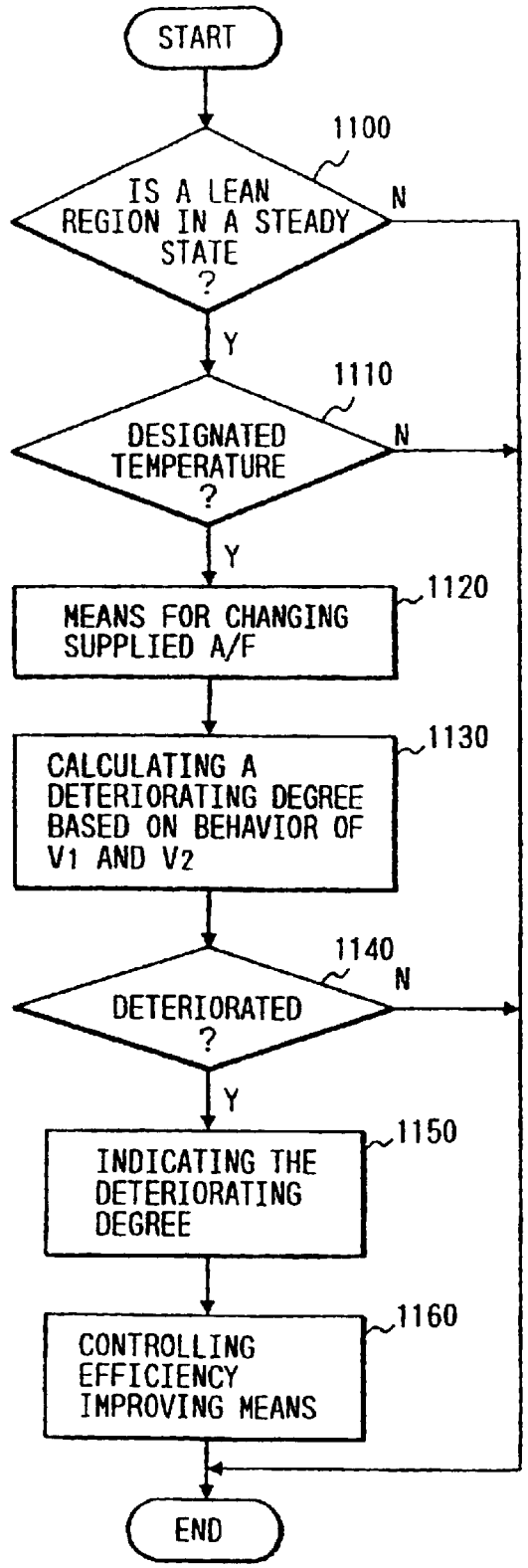
FIG. 29 is a flow diagram for control in the detecting method shown in FIG. 28(A).

Furthermore, another method for detecting efficiency and deteriorating degree is indicated in FIGS. 28(A), 28(B), and 28(C). Referring to FIG. 28(A), an air-fuel ratio of mixture which is supplied to an engine 1 is altered intentionally by changing injecting amount of fuel and throttle opening of a fuel injecting valve 19, and the deteriorating degree of the catalyst is determined based on difference in behavior of signals from the sensors 7, 8, which are located at upstream side and downstream side of the catalyst 4, respectively. As shown in FIG. 28(B), when the air-fuel ratio is altered stepwise, outputs from the sensors 7, 8 also change stepwise. However, when the catalyst is deteriorated, a difference in responses from the respective sensors 7, 8 located at upstream side and downstream side of the catalyst changes from the difference when the catalyst is not deteriorated. For instance, behavior of sensors which have linear outputs corresponding to the air-fuel ratio are indicated by solid lines in FIG. 28(B), in which the difference in time constant τ of the response increases when the catalyst is deteriorated. Behavior of regular oxygen sensor outputs are also indicated by chain lines, in which the difference in time constant τ of the response increases similarly when the catalyst is deteriorated. In FIG. 28(C), a case when the air-fuel ratio of the mixture at supply side is altered randomly or in accordance with a rule is indicated. The deteriorating degree is determined by correlation between changes in signals from the sensors 7, 8. When the signal from the sensor 8 is remarkable more dull than that from the sensor 7, the catalyst can be regarded as deteriorated. A flow chart for determining the deterioration of the catalyst by the present method is indicated in FIG. 29. After operating condition is judged at step 1100 as within a lean operating region and in a normal operation, catalyst temperature is judged whether it is in a designated temperature range or not at step 1110. Subsequently, after satisfying the step 1110, air-fuel ratio of mixture supplied to the engine is altered at step 1120. Next, the deteriorating degree of the catalyst is determined by the method indicated in FIGS. 28(A), 28(B), and 28(C) based on the difference of behavior in time constant τ of the response signal V1, V2 from the sensors before and after the catalyst at step 1130 When it is judged as deteriorated in step 1140, the deteriorating degree is indicated at step 1150, and, subsequently, operation of the efficiency improving means shown in FIGS. 21 and 22 is started at step 1160.

In accordance with the present invention, it becomes possible to detect decrease in catalyst efficiency on account of long period operation accurately. Furthermore, an engine can be controlled so as to avoid decreasing in the efficiency, and a preferable exhaust gas cleaning characteristics can be maintained.

What is claimed is:

1. An evaluating method for catalyst which is installed in an exhaust gas system of an internal combustion engine; the catalyst including a $NO_x$ catalyst for purifying exhaust gas components with at least one of a three-way catalyst and an oxidizing catalyst which are evaluated based on any combination of output signals of at least two sensors for detecting specified components in the exhaust gas which are arranged at upstream, downstream, and intermediate points of said catalyst; comprising providing a first region for diagnosing said $NO_x$ catalyst different from a second region for diagnosing said three-way catalyst or said oxidizing catalyst wherein the first region for diagnosing said $NO_x$ catalyst is a lean driving region, and the second region for diagnosing said three-way catalyst or said oxidizing catalyst is a driving region which has an excess air ratio $\lambda=1$.

2. A catalytic efficiency controlling method for $NO_x$-eliminating catalyst installed in an exhaust gas system of internal combustion engine for eliminating $NO_x$ in exhaust gas comprising evaluating an elimination efficiency of said $NO_x$-eliminating catalyst, and when the eliminating efficiency of said $NO_x$-eliminating catalyst is evaluated as deteriorated, increasing hydrocarbon supplied to said $NO_x$-eliminating catalyst by controlling at least any of the amount of assist-air or flow rate of a swirl-path of an assist-air injector.

3. A diagnosing method as for lean $NO_x$-eliminating catalyst installed in an exhaust gas system of an internal combustion engine, comprising evaluating deterioration of performance of the catalyst is diagnosed in accordance with an intended variation in air-to-fuel ratio to determine the presence of a degraded response delay of at least one sensor, wherein said air-to-fuel ratio is varied by varying an injecting amount of fuel or varying an opening angle of throttle valve.

4. A diagnosing method for lean $NO_x$-eliminating catalyst installed in an exhaust gas system of an internal combustion engine, comprising evaluating deterioration of performance of the catalyst is diagnosed in accordance with an intended variation in air-to-fuel ratio to determine the presence of a degraded response delay of at least one sensor, further comprising providing two sensors as the at least one second, wherein said lean $NO_x$-eliminating catalyst is evaluated by output signals from the sensors, upstream and downstream of said lean $NO_x$-eliminating catalyst.

5. A diagnosing method for lean $NO_x$-eliminating catalyst installed in an exhaust gas system of an internal combustion engine, comprising evaluating deterioration of performance of the catalyst is diagnosed in accordance with an intended variation in air-to-fuel ratio to determine the presence of a degraded response delay of at least one sensor, wherein the efficiency or deterioration of said lean $NO_x$-eliminating catalyst is evaluated by output signals from the at least one sensor arranged downstream of said lean $NO_x$-eliminating catalyst.

6. A diagnosing method for lean $NO_x$-eliminating catalyst installed in an exhaust gas system of an internal combustion engine, comprising evaluating deterioration of performance of the catalyst is diagnosed in accordance with an intended variation in air-to-fuel ratio to determine the presence of a degraded response delay of at least one sensor, wherein the diagnosing of the catalyst is conducted at a temperature in a designated range.

7. A diagnosing method for lean $NO_x$-eliminating catalyst installed in an exhaust gas system of an internal combustion engine, comprising evaluating deterioration of performance of the catalyst is diagnosed in accordance with an intended variation in air-to-fuel ratio to determine the presence of a degraded response delay of at least one sensor, wherein the evaluating of said catalyst judges whether catalyst temperature is within a temperature range where the at least one sensor is activated.

8. A diagnosing method for lean $NO_x$-eliminating catalyst installed in an exhaust gas system of an internal combustion engine, comprising evaluating deterioration of performance of the catalyst is diagnosed in accordance with an intended variation in air-to-fuel ratio to determine the presence of a degraded response delay of at least one sensor, further comprising displaying a judgment result when the catalyst is judged to be deteriorated.

* * * * *